(12) United States Patent
Wieder

(10) Patent No.: US 7,862,326 B2
(45) Date of Patent: Jan. 4, 2011

(54) MOLD LOCK

(75) Inventor: Klaus A. Wieder, Helenville, WI (US)

(73) Assignee: Accura Tec, Inc., Helenville, WI (US)

( * ) Notice: Subject to any disclaimer, the term of this patent is extended or adjusted under 35 U.S.C. 154(b) by 262 days.

(21) Appl. No.: 12/026,555

(22) Filed: Feb. 5, 2008

(65) Prior Publication Data
US 2008/0286397 A1 Nov. 20, 2008

Related U.S. Application Data

(60) Provisional application No. 60/888,217, filed on Feb. 5, 2007.

(51) Int. Cl.
B29C 33/22 (2006.01)
(52) U.S. Cl. .................... 425/472; 425/190; 425/451.9; 425/595
(58) Field of Classification Search ................ 425/190, 425/192 R, 451.9, 595, 472
See application file for complete search history.

(56) References Cited

U.S. PATENT DOCUMENTS

| 1,717,109 | A | * | 6/1929 | Last ............................ 164/29 |
| 3,081,494 | A | * | 3/1963 | Darnell ....................... 249/160 |
| 4,000,561 | A | | 1/1977 | Wieder et al. |
| 4,520,991 | A | * | 6/1985 | Letica ......................... 249/122 |
| 4,750,876 | A | * | 6/1988 | Lawson ....................... 425/406 |
| 4,765,585 | A | | 8/1988 | Wieder |
| 5,762,977 | A | * | 6/1998 | Boskovic .................. 425/451.9 |
| 6,308,929 | B1 | | 10/2001 | Wieder |
| 6,328,552 | B1 | * | 12/2001 | Hendrickson et al. ........ 425/190 |
| 6,558,145 | B2 | | 5/2003 | Wieder |
| 6,921,256 | B2 | * | 7/2005 | Bokich ........................ 425/190 |
| 6,953,331 | B2 | * | 10/2005 | Bokich .................... 425/192 R |
| 6,981,858 | B2 | | 1/2006 | Wieder |
| 7,232,303 | B1 | * | 6/2007 | Dooley et al. ........... 425/192 R |

FOREIGN PATENT DOCUMENTS

| KR | 20-1990-0002403 | 3/1990 |
| KR | 10-1998-083853 | 12/1998 |

* cited by examiner

Primary Examiner—James Mackey
(74) Attorney, Agent, or Firm—Boyle Fredickson, S.C.

(57) ABSTRACT

A mold lock for a mold that includes a plurality of interlocking arrangements that are configured to provide at least a plurality of interlocks during mold closing. A male interlocking arrangement includes a head with a nose that has a recessed or offset portion that facilitates primary interlocking during mold closing. The nose can be configured with one or more spaced apart bosses that make contact with arms of a female interlocking arrangement at an initial point of contact that then facilitate mold alignment when a second point of contact is achieved.

38 Claims, 18 Drawing Sheets

MOLD LOCK

CROSS REFERENCE TO RELATED APPLICATION

This application claims the benefit under 35 U.S.C. §119(e) of U.S. Provisional Application Ser. No. 60/888,217, filed Feb. 5, 2007, the entirety of which is expressly incorporated by reference herein.

FIELD

The present invention relates to a mold lock for facilitating mold alignment and more particularly to a mold lock having at least a plurality of interlocks each of which facilitates mold alignment during closure and lock up and which is capable of achieving true positioning final lockup taper.

BACKGROUND

Molds, such as those used in injection molding, typically include two mold halves that can each be equipped with a mold cavity used to make some part. During molding, relative movement between the mold halves bring the two halves together to initiate a molding cycle. A moldable material, such as a plastic, a resin, or the like, is injected into each cavity. After the moldable material has had a certain amount of time to set, the mold halves are separated and the molded part is ejected.

This process typically does not take very long. For example, in some molding application, the complete cycle time to make a molded component can be as little as a couple of seconds.

Molds are equipped with mold interlocks that help ensure accurate alignment and guidance of the mold halves during mold setup and later when they are repeatedly being brought together during operation. Such locks are also intended to help ensure guidance between mold cores and stripper inserts, when such mold components are used.

Typically, each mold has four such interlocks with an interlock located along each side of the mold. Each interlock includes a head, or male portion, that is attached to one mold half and a receptacle, or female portion, that is attached to the other mold half. When the mold halves come together, the head of each interlock is received in its respective receptacle helping to ensure accurate mating of the mold halves.

During mold setup, interlocks are attached to the mold halves at parting line and one mold half is brought into mating contact with the other mold half. When mated, the head of each interlock is received in its respective receptacle. Various components of the mold are thereafter adjusted to locate the mated mold halves relative to each other. This helps ensure smooth, fast and accurate operation of the mold during molding operation.

During molding operation, as the mold halves are brought together, the head of each interlock is received in the receptacle. The receptacle has one or more sidewalls that guide movement of the head as it enters and moves into the receptacle. As the head enters and moves into the receptacle it helps guide the mold halves together to ensure that that they accurately mate with each other. By helping to ensure accurate mating, mold interlocks help correct or compensate for slight misalignment between mold halves. This also helps ensure that mold cavities accurately overlie each other during molding and that the mold cavity shut-offs properly align.

One very common type of mold interlock is a side lock. A side lock has a head that extends outwardly from a horizontal mounting base that is of square or rectangular cross section. The head is defined by straight sidewalls that are typically generally perpendicular to the base. During operation, the head is received in a receptacle that is defined by a pair of straight sidewalls that are generally parallel to the straight sidewalls of the head.

Side locks are simple to use and install. They typically designed with an angular clearance of zero degrees and a dimensional clearance of between 0.0002 and 0.0004 inch between the head and the receptacle. They also allow for thermal expansion of the mold halves when properly installed. Zero clearance locking fitting typically is not required.

They are not without drawbacks. Their relatively narrow clearance means that they can bind if not opened in parallel, which can occur if there is some misalignment. These types of locks give little protection to smaller angle shut-offs, which can lead to close-off or shut-off misalignment or clashing. They usually need lubrication, which means that they cannot be used in certain medical and food component molding applications where lubricants typically cannot be used. Even when lubricated, metal to metal contact between the head and receptacle often result in excessive wear because any lubricant is often wiped during mold operation.

Another common type of lock is a rectangular tapered interlock. They are similar in construction to a side lock, except that its head is longer and its sidewalls tapered. While its sidewalls that define its head are straight, each sidewall has a taper angle of about 10° from perpendicular. Each sidewall of the receptacle in which the head is received is complementarily tapered. This type of lock is machined into both cavity mold halves at parting line and adjusted to zero clearance by grinding the overall height of the head.

This type of mold interlock is easy to install, provides a larger contact area, and accommodates greater mold misalignment than does a side lock. However, it too suffers from many of the drawbacks of side locks. For example, its tapered straight sidewall construction provides little protection to relatively small angle shut-offs. As a result, shut-off misalignment or clashing can undesirably occur. Lubrication can also be a problem. This can limit its use and lead to premature replacement due to excessive wear.

A still further type of mold interlock is a tapered round interlock. It has a head defined by a tapered, conical sidewall that is received in a complementary receptacle. Its application is limited because it does not accommodate thermal expansion and provide little protection for smaller angle shut-offs.

What is needed is a mold interlock that does not suffer from at least one or more of the aforementioned drawbacks. What is also needed is a mold interlock that is more economical to use.

SUMMARY

The present invention is directed to a mold lock for a mold that includes a plurality of interlocking arrangements that are configured to provide at least a plurality of interlocks during mold closing. A male interlocking arrangement includes a head with a nose that has a recessed or offset portion that facilitates primary interlocking during mold closing. The nose can be configured with one or more spaced apart bosses that make contact with arms of a female interlocking arrangement at an initial point of contact that then facilitate mold alignment when a second point of contact is achieved.

A mold lock for a mold that has a plurality of mold halves comprising a plurality of interlock arrangements that are constructed and arranged to provide at least one mold interlock when engaged during closing of the mold by bringing a mold halves together via relative movement therebetween. A mold lock where the plurality of interlock arrangement are constructed and arranged to provide a plurality of mold interlocks. A mold lock of where one of the interlock arrangements includes a female interlock arrangement having a socket formed therein and at least one interlock projection extending outwardly therefrom and the other one of the interlock arrangements includes a male interlock arrangement having an outwardly extending interlock nose that seats in the socket formed in the female interlock arrangement defining a first interlock and having an interlock channel formed therein in which the at least one interlock projection seats, providing a second interlock.

A mold lock where the female interlock arrangement has a plurality of spaced apart interlock projections and the male interlock arrangement has a plurality of spaced apart interlock channels formed therein that each seat one of the interlock projections, providing a second interlock and a third interlock during mold closing. A mold lock of where one of the interlock projections is disposed on one side of the socket formed in the female interlock arrangement and the other one of the interlock projections is disposed on the other side of the socket formed in the female interlock arrangement and where one of the interlock channels formed in the male interlock arrangement is disposed on one side of the interlock nose and the other one of the interlock channels formed in the male interlock arrangement is disposed on the other side of the interlock nose. A mold lock where the female interlock includes a generally U-shaped body and the male interlock arrangement includes a generally W-shaped body.

A mold lock where one of the interlock arrangements includes a female interlock arrangement having a socket formed therein defined by a base and a pair of outwardly extending and generally parallel arms with at least one arm including a flange extending outwardly from its free end that defines an interlock projection and where the other one of the interlock arrangements includes a male interlock arrangement having an elongate head projecting outwardly from a base with the head receivable in the socket during mold closing defining a first interlock and including at least one flange extending from the base outwardly generally parallel to the head and spaced from the head so as to define an interlock channel therewith that receives the interlock projection therein during mold closing, defining a second interlock. A mold lock of where the interlock projection flange has an end wall and an inclined sidewall and the interlock channel-defining flange has an end wall and an inclined sidewall that engages the inclined sidewall of the interlock projection flange during interlocking during mold closing, providing a tapered interlock surface therebetween. A mold lock where the arm of the female interlock arrangement that carries the interlock projection flange has an end wall disposed adjacent to the inclined interlock projection flange sidewall that abuts against the interlock channel, defining flange end wall during mold closure. A mold lock where the head is defined by a pair of generally parallel sidewalls that extend outwardly from the base with each head sidewall having a tapered sidewall segment that extends to or adjacent the base and where each outwardly tapered sidewall segment of the head engages a corresponding one of the arms when the head is fully seated in the socket providing a tapered interlock surface therebetween. A mold lock where the head further includes a nose at its free end that includes at least one outwardly extending boss that engages a portion of the arm when the nose is seating in the socket during mold closure. A mold lock where the at least one boss has a rounded outer surface. A mold lock where the at least one boss is inwardly offset relative to the adjacent head sidewall enabling engagement with an adjacent arm when the nose is seating in the socket in a manner that compensates for misalignment between the mold halves during mold closure. A mold lock where the at least one boss includes a rotatable, elongate roller. A mold lock where the at least one boss is inwardly offset relative to the adjacent head sidewall providing clearance with a corresponding adjacent arm enabling engagement with the adjacent arm when the nose is seating in the socket in a manner that compensates for as much as 5° misalignment between the mold halves during mold closure. A mold lock where there is at least 0.1 inch clearance between the at least one boss and the adjacent arm at or adjacent a mouth or opening of the socket. A mold lock where there is between a 0.1 inch clearance and a 0.3 inch clearance between the at least one boss and the adjacent arm. A mold lock where there is about 0.2 inch clearance between the at least one boss and the adjacent arm.

A mold lock where one of the interlock arrangements includes a female interlock arrangement that has a socket defined by a pair of arms and the other one of the interlock arrangements includes a male interlock arrangement that has a head with a nose at its free end that makes initial interlocking engagement with one or both of the arms defining the socket when the mold halves are spaced from one another a distance that is between one third and one half the combined length of the head and nose. A mold lock where one of the interlock arrangements includes a female interlock arrangement that has a socket defined by a pair of arms and the other one of the interlock arrangements includes a male interlock arrangement that has a head with a nose at its free end that includes at least one outwardly extending boss that engages a portion of the arm when the nose is seating in the socket during mold closure. A mold lock where the at least one boss has a rounded outer surface. A mold lock where the at least one boss is inwardly offset relative to the adjacent head sidewall enabling engagement with an adjacent arm when the nose is seating in the socket in a manner that compensates for misalignment between the mold halves during mold closure. A mold lock where the at least one boss includes a rotatable, elongate roller. A mold lock where the at least one boss is inwardly offset relative to the adjacent head sidewall providing clearance with a corresponding adjacent arm enabling engagement with the adjacent arm when the nose is seating in the socket in a manner that compensates for as much as 5° misalignment between the mold halves during mold closure. A mold lock where there is at least 0.1 inch clearance between the at least one boss and the adjacent arm at or adjacent a mouth or opening of the socket. A mold lock where there is between a 0.1 inch clearance and a 0.3 inch clearance between the at least one boss and the adjacent arm. A mold lock where there is about 0.2 inch clearance between the at least one boss and the adjacent arm.

A mold lock where one of the interlock arrangements includes a female interlock arrangement that has a socket defined by a pair of arms and the other one of the interlock arrangements includes a male interlock arrangement that has a head with a nose at its free end that includes a pair of socket arm contacts with one of the socket arm contacts disposed adjacent a free end of the nose and the other one of the socket arm contacts disposed a distance from the free end that results in a ratio of the width of the nose to the distance from the free end being between 1.5 and 1.75. A mold lock where the ratio is about 1.6.

BRIEF DESCRIPTION OF THE DRAWINGS

Preferred exemplary embodiments of the invention are illustrated in the accompanying drawings, in which.

Figure 1:
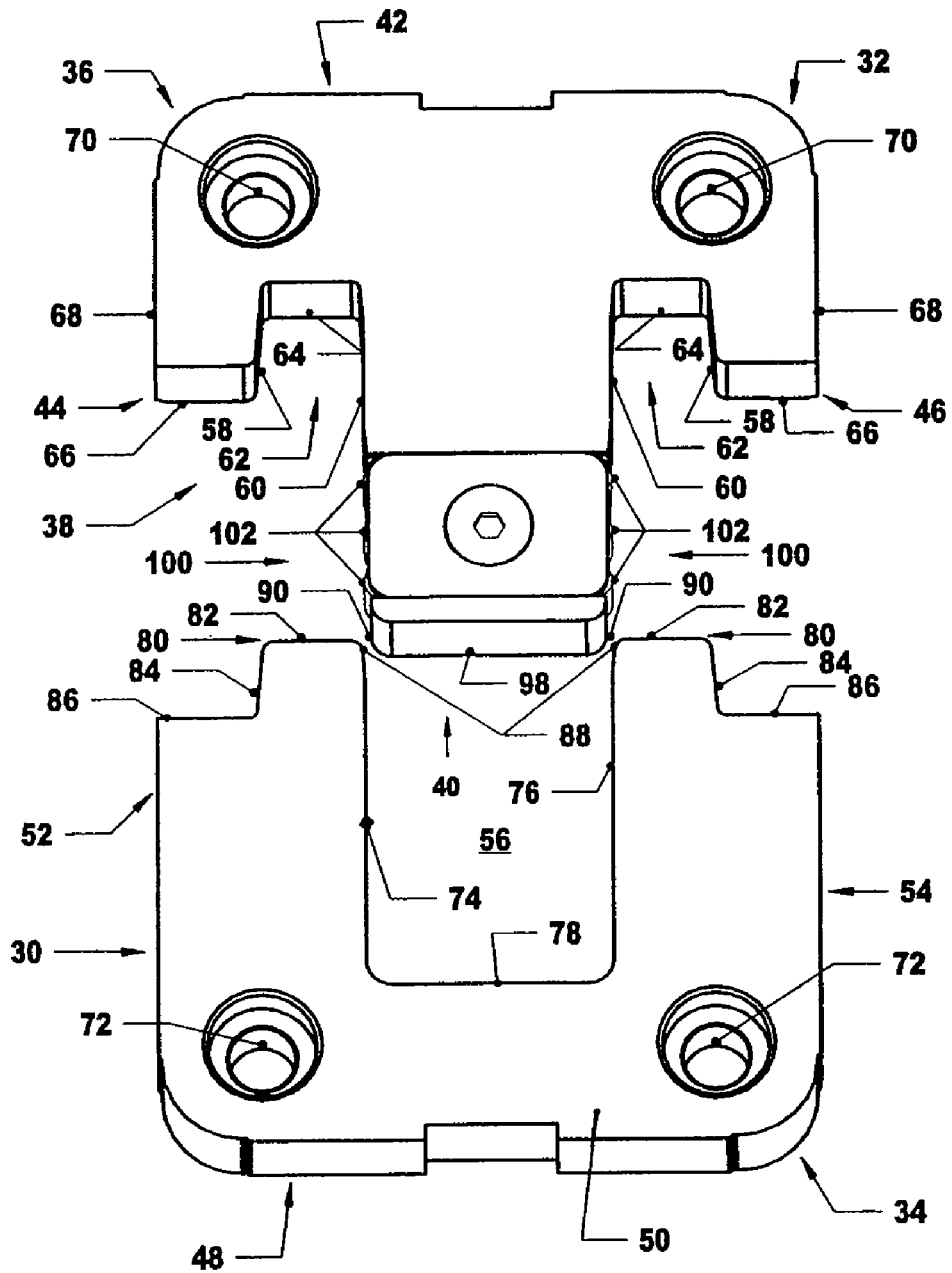
FIG. 1 is a front elevation view of a first embodiment of a mold lock equipped with a plurality of secondary interlocks constructed in accordance with the present invention.

Before explaining embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

Figure 2:
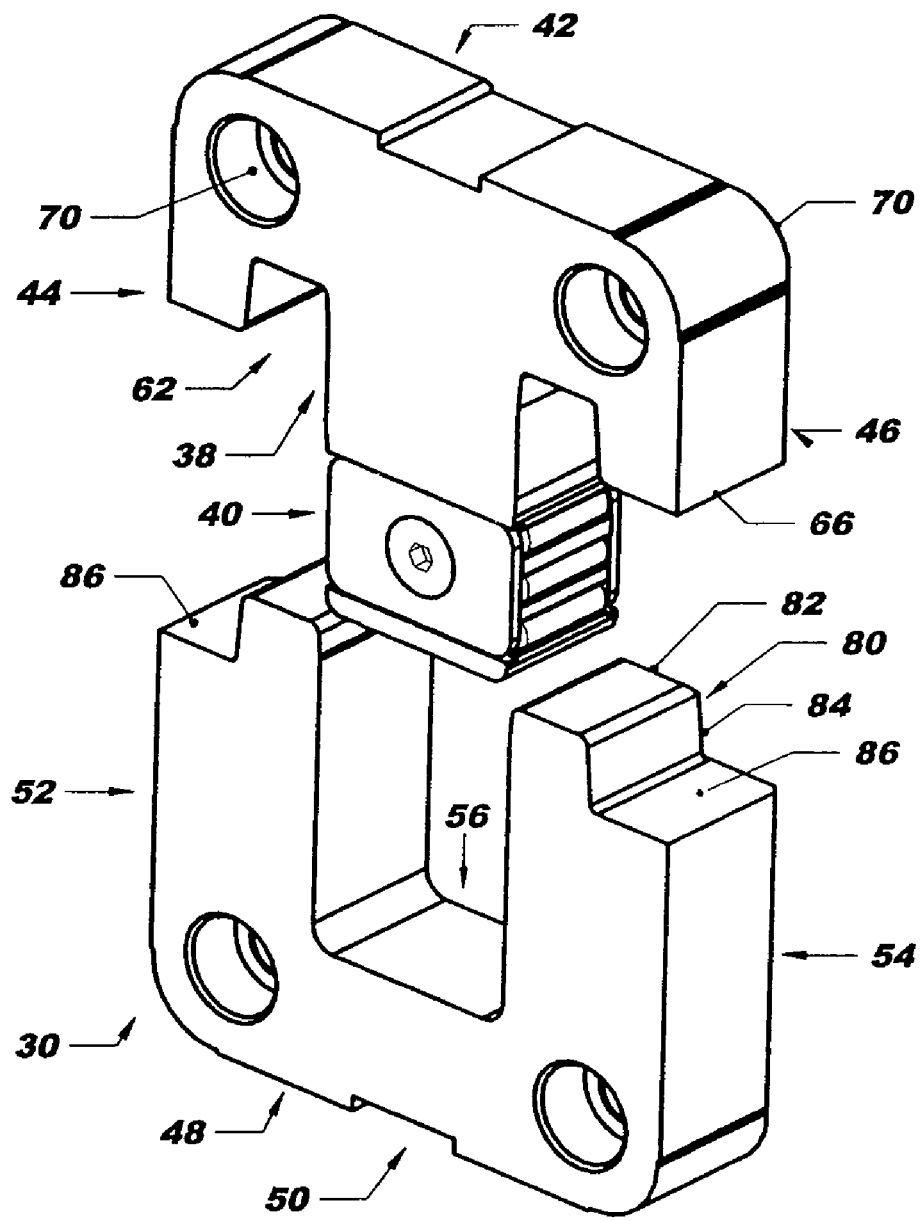
FIG. 2 is a perspective view of the mold lock embodiment of FIG. 1.
Figure 3:
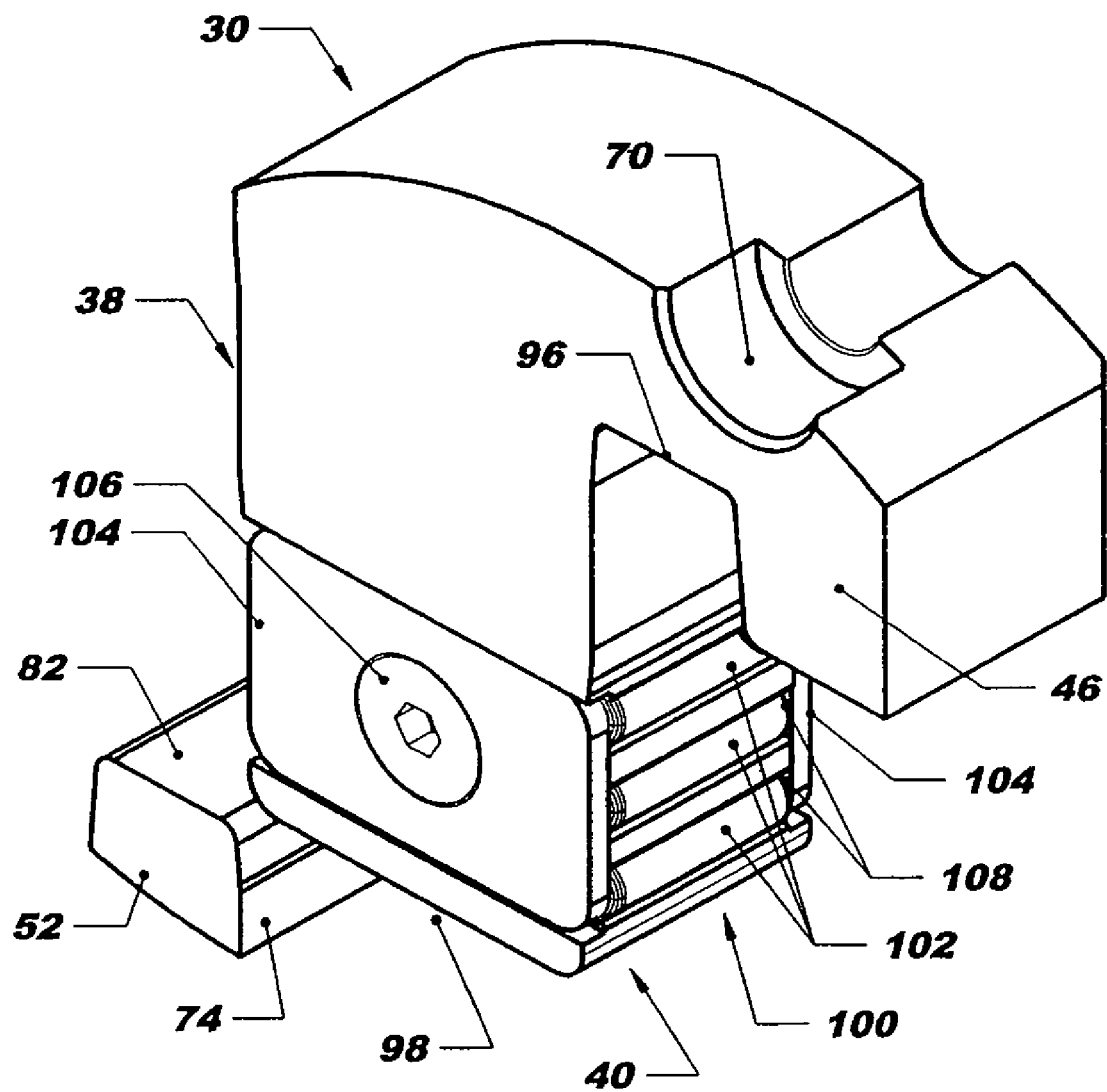
FIG. 3 is an enlarged, fragmentary perspective view of a head of the mold lock of FIG. 2.

FIGS. 1-3 illustrates a first preferred embodiment of a mold lock 30 constructed in accordance with the present invention made up of at least a plurality of mating interlocks for enabling more accurate closure of one mold half onto or otherwise against at least one other mold half. The embodiment shown in FIG. 1 has a male interlock assembly 32 which releasably mates with a female interlock receiver 34 during closing of a mold to help align its two mold halves as they come together. The male interlock assembly 32 and female interlock receiver 34 are constructed and arranged to define a plurality of interlocks during engagement to more quickly, more accurately and more reliably facilitate mold closure all while being able to compensate for greater misalignment between mold halves during closure than prior art locks have been able to acceptably tolerate in the past.

The male interlock assembly 32 has a W-shaped body 36 with a centrally located outwardly projecting head 38 that includes a nose 40 that extends outwardly from a transverse elongate base 42 from which an alignment-facilitating flange 44, 46 extends at each end that also flank the head 38. The female interlock receiver 34 has a U-shaped body 48 having a base 50 from which a pair of outwardly extending arms 52, 54, which are spaced apart so as to define a socket 56 that releasably receives the nose 40 and head 38 of the male interlock assembly 32. Each one of the bodies 36, 48 include a plurality of mounting through bores 70, 72 that each receive a fastener used to mount each to a corresponding mold half.

Each of the male interlock flanges 44, 46 include an inner sidewall 58 spaced from a corresponding outwardly facing sidewall 60 of the head 38 that defines an interlock channel 62 therebetween in which a portion of a corresponding one of the receiver arms 52, 54 is releasably received when the nose 40 is seated in the socket 56 of the interlock receiver 34. A channel end wall 64 extends between each flange 44, 46 and the corresponding sidewall 60 facing toward the flange 44, 46. Thus, each one of the flanges 44, 46 are partially formed by a corresponding inner flange sidewall 58 that opposes and is generally parallel with at least a portion of the head sidewall 60 facing toward it. Each one of the flanges 44, 46 is further formed by a flange end wall 66 and an outer flange sidewall 68.

In the preferred lock embodiment depicted in FIGS. 1-3, the outer sidewall 68 of each interlock flange 44, 46 faces outwardly away from the head sidewall 60 that faces toward the flange 44, 46. While the outer sidewall 68 of each interlock flange 44, 46 is shown as being generally parallel with inner sidewall 58, the sidewall 68 can be disposed at an angle relative thereto depending on the configuration of the mounting receptacle in the mold half to which the male interlock assembly 32 mounts.

The arms 52, 54 of the female interlock receiver 34 have inner opposing sidewalls 74, 76 spaced apart by an end wall 78 of the base 50 in the manner shown in FIGS. 1-3 that defines the socket 56. As is depicted by FIGS. 1-3, the interlock socket 56 has a configuration that is of substantially complementary construction to that of the nose 40 and at least a portion of the head 38. In the preferred embodiment depicted in FIGS. 1-3, the socket defining arms 52, 54 are generally parallel to one another and the socket defining end wall 74 is substantially perpendicular to both arms 52, 54.

Each arm 52, 54 has an interlock projection 80 that extends outwardly from its free end seats in a corresponding one the interlock channels 62 when the nose 40 seats in socket 56 during mold closing. Each interlock projection 80 is defined by part of a corresponding arm inner sidewall 74, 76, by a top or end wall 82, and by an outer sidewall 84 that terminates at an arm end wall 86. Engagement between each projection 80 and its corresponding channel 30 provides an additional interlock that complements the interlock provided when the nose 40 is seated in the receiver socket 56, helping to better facilitate interlocking during mold closure.

Each receiver socket defining sidewall 74, 76 has a rounded inner top corner 88 so as to help guide the nose 40 into the socket 56 during interlocking. The nose 40 also has rounded outer bottom corners 90 for the same reason. These rounded corners help facilitate insertion of the nose 40 into the socket 56 during mold closing in a manner that accommodates some slight misalignment between mold halves during mold closing. Where mold misalignment causes the nose 40 to enter the socket 56 off center relative to the socket 56, engagement between the rounded corner 88 and part of the adjacent leading corner 90 of the entering nose 40 results in relative movement therebetween that guides and centers the nose 40 in the socket 56 as the mold further closes until the nose 40 smoothly travels the rest of the way into the socket 56 until it fully seats in the socket 56.

Figure 4:
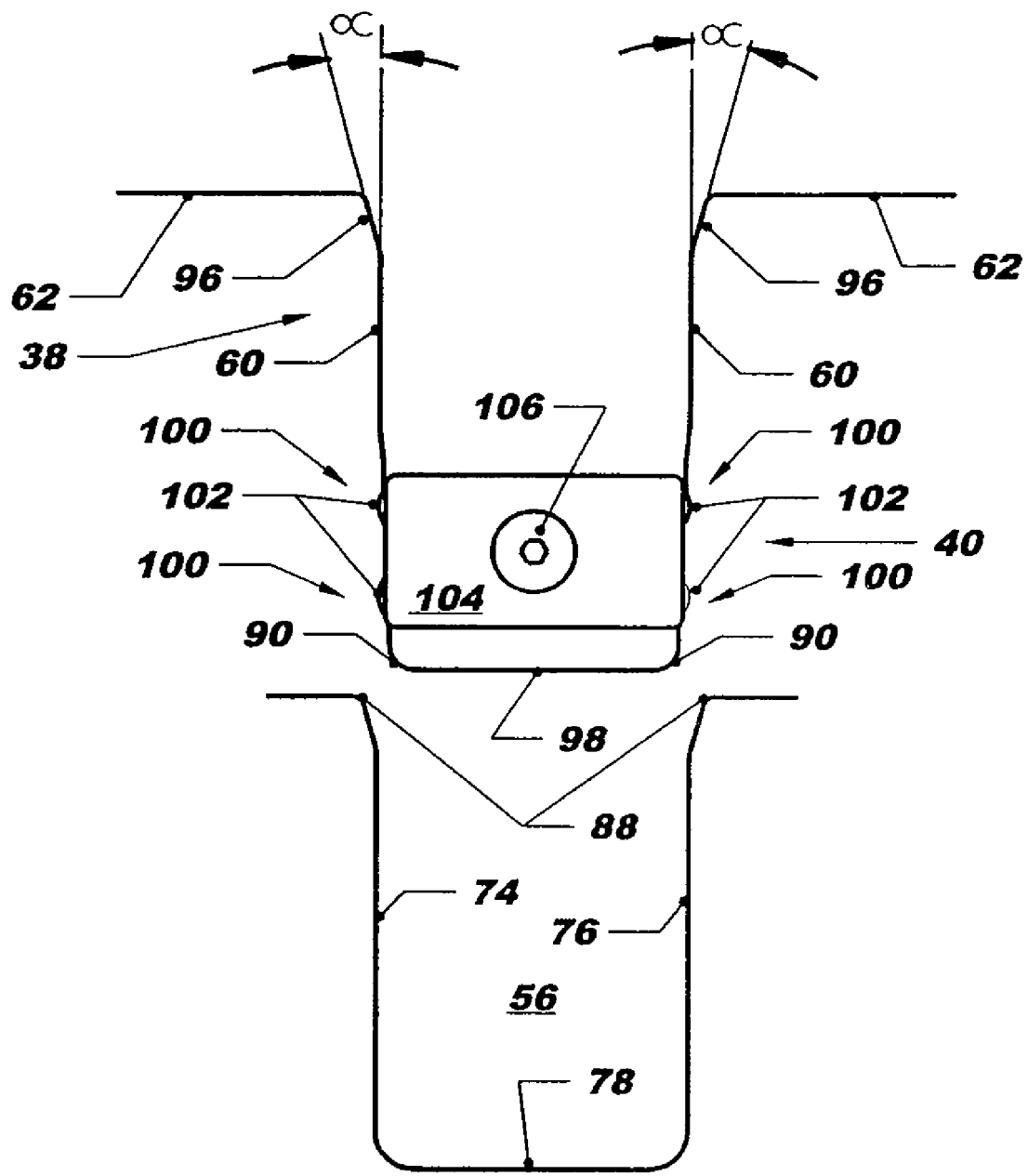
FIG. 4 is an enlarged fragmentary elevation view of a portion of the preferred mold lock embodiment of FIGS. 1-3 that illustrates a tapered interlock.

With reference to FIG. 4, to help ensure that interlocking occurs, each outer sidewall 84 of each interlock projection 80 can be tapered so as to be disposed at an angle, $\alpha$, relative to a line 92 (dashed or in phantom in FIG. 4) that is substantially parallel to adjacent socket sidewall 76 such that a supplemental interlock configured in this manner provides a tapered interlock. For example, in the embodiment shown in FIG. 4, the angle, $\alpha$, of the taper is an acute angle that is no more than 10°. In the preferred embodiment depicted in FIG. 1, the outer sidewall 84 of each projection 80 is inclined or tapered so as to define an angle, $\alpha$, that is about 5° thereby providing a tapered interlock when the interlock projection 80 is received in interlock channel 62. For example, sidewall 84 can be inclined at an angle, $\alpha$, of no more than about 5°. Such a tapered interlock advantageously helps facilitating interlocking by providing a more positive interlock that is more accurate and which can accommodate greater misalignment than conventional mold locks. Where outer interlock projection sidewall 84 is inclined at an angle, $\alpha$, the adjacent interlock channel sidewall 58 is also inclined at an angle, $\delta$, (relative to line 94 in FIG. 4) that is substantially complementary to that of sidewall 84.

During interlocking engagement, end wall 82 can abut against end wall 64 when the interlock projection 80 is received in its interlock channel 62 and sidewall 84 abuts against sidewall 58 thereby increasing the surface area of contact between the male interlock assembly 32 and female interlock receiver 34 while advantageously facilitating positive interlocking. In the preferred embodiment shown in FIGS. 1-3, end wall abuts end wall 64 when the interlock projection 80 is received in interlock channel 62 during interlocking that occurs during mold closure. This interlocking, of course, is in addition to the interlocking that is provided when the nose 40 and/or head 38 is received in the socket 56 in the receiver 34.

Figure 5:
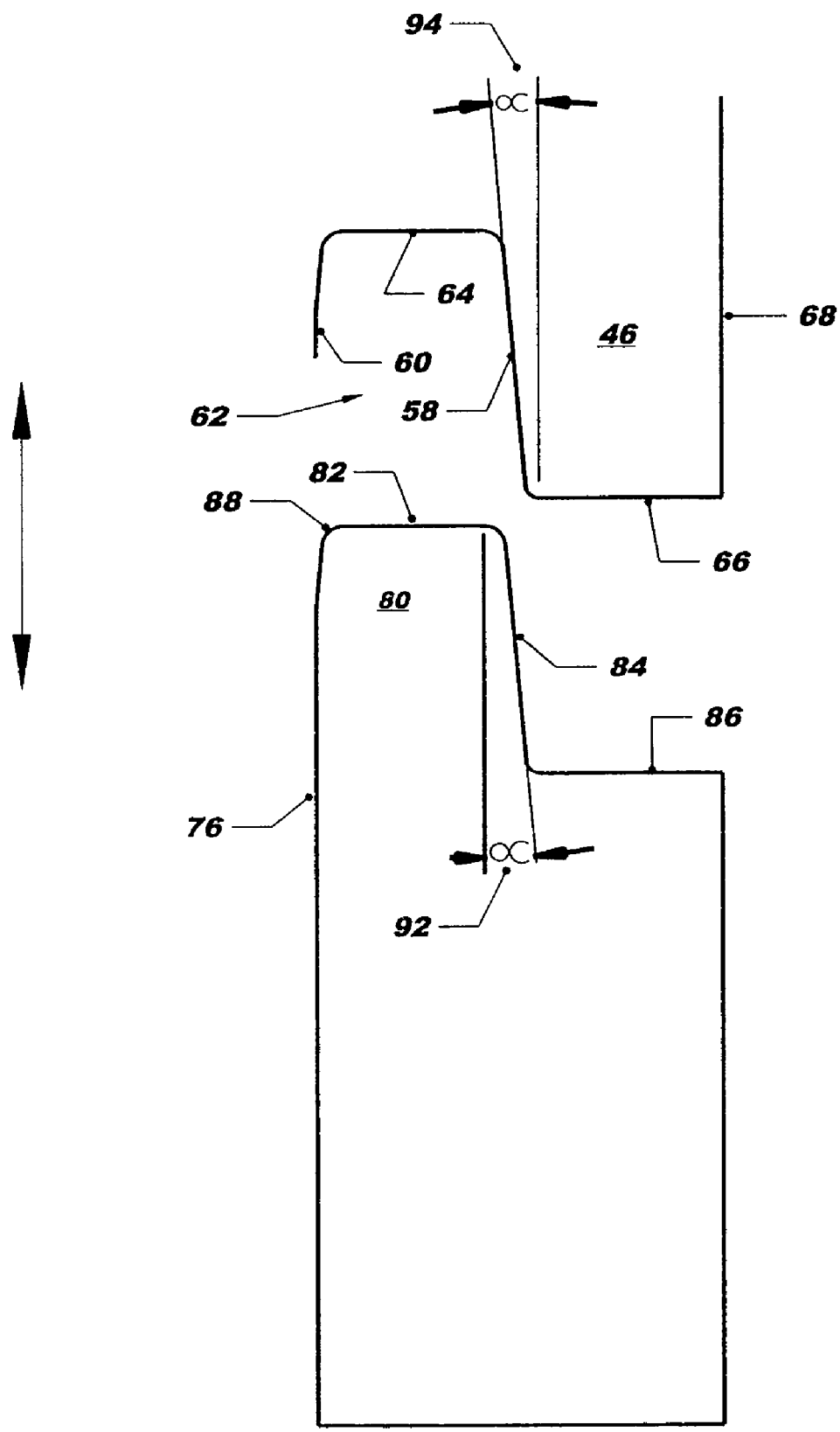
FIG. 5 is an enlarged fragmentary elevation view of a portion of another portion of the preferred lock embodiment of FIGS. 1-3 that illustrate another tapered interlock.

With reference to FIG. 5, to further help ensure that a good interlock is achieved, at least a portion of each head sidewall 60 can be constructed with a tapered segment 96 that extends to where it adjoins wall 64. As a result, at least a portion of each tapered segment 96 engages part of the corresponding socket-defining sidewall 74, 76 at or adjacent rounded corner 88 when the nose 40 and/or head 38 are completely received in the socket 56. While an end wall 98 of the nose 40 can abut the socket end wall 78 when the nose 40 and/or head 38 are completed seated in the socket 56, a slight gap is left therebetween in at least one preferred lock embodiment constructed in accordance with the invention.

Where equipped with such a tapered wall segment 96, the angle, E, of the taper of the segment 96 relative to sidewall 60 is at least about 1°. In one preferred embodiment, the angle, E, is between 2° and 10°. In a preferred embodiment, the taper angle, E, is about 5°. In another preferred embodiment, the taper angle, E, is greater than 0° and no greater than about 2°.

When the nose 40 of the male interlock assembly 32 seats in the socket 56 of the lock receiver 34, engagement between each tapered sidewall portion 96 of the nose sidewall 60 and/or the tapered interlock projection outer sidewall 84 creates an interference fit with the corresponding surfaces they engage that provides an interlock that is more accurate than that provided by a conventional mold lock. In one preferred embodiment, the outer sidewall 84 of each projection 80 provides a 5° tapered interlock in addition to the interlock provided between the nose 40 and/or the head 38 and the socket 56 when the nose 40 and/or head 38 is seated in the socket 56. Such an arrangement advantageously achieves substantially true positioning of one mold half relative to the other mold half.

To help facilitate faster, smoother, more accurate repeatable seating of the nose 40 in the socket 56, the nose 40 has at least one boss 100 that extends outwardly from at least one of sidewalls 60 to engage a corresponding socket defining sidewall 74, 76 during seating of the nose 40 in the socket 56. In the embodiment shown in FIGS. 1-3, there are three bosses 100 that extend outwardly from each head sidewall 60 toward each socket-defining sidewall 74, 76. In the embodiment shown in FIG. 5, there is a pair of bosses 100 that extend outwardly from each side of the nose 40 and/or head 38.

Figure 15A:
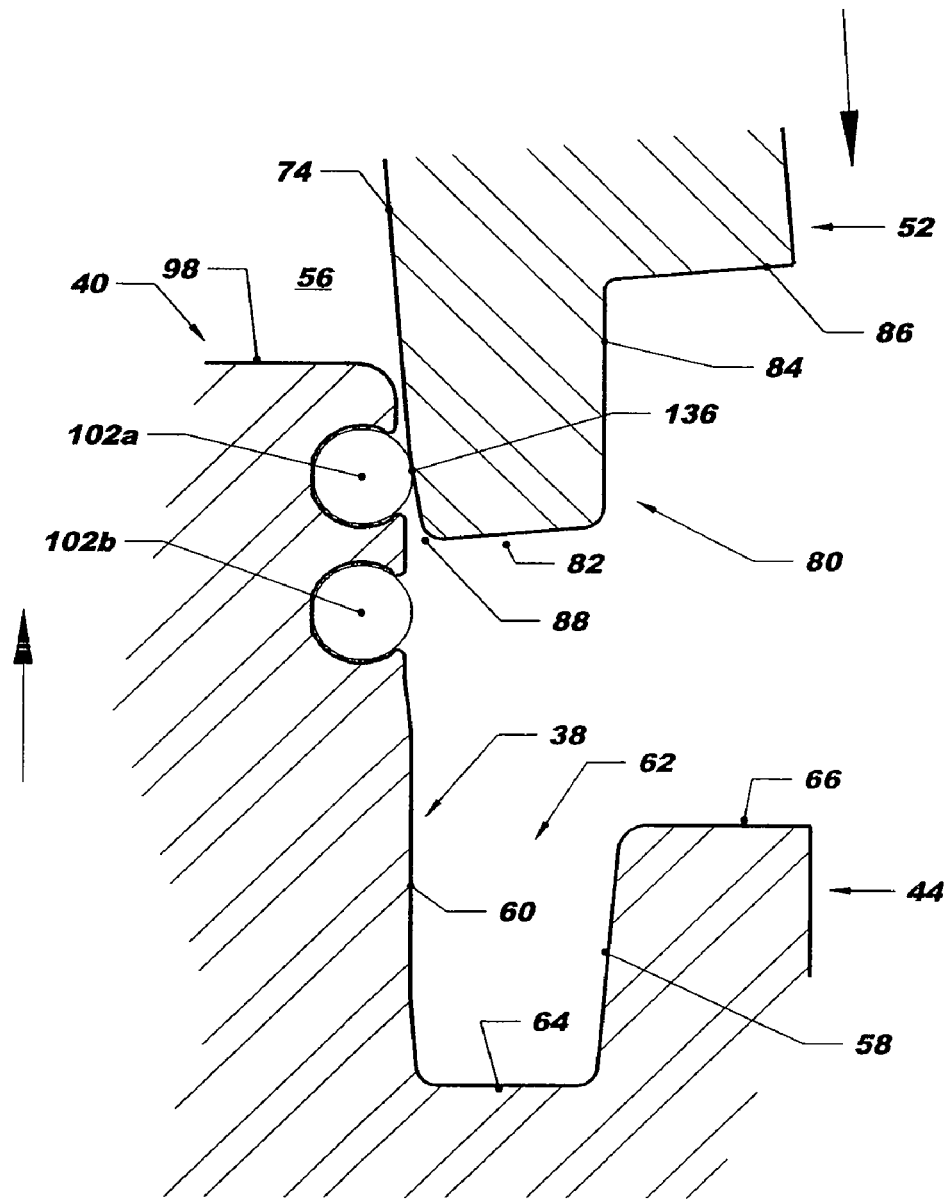
FIG. 15A illustrates a fragmentary elevation view of a portion of the mold lock depicted in FIG. 9.
Figure 15B:
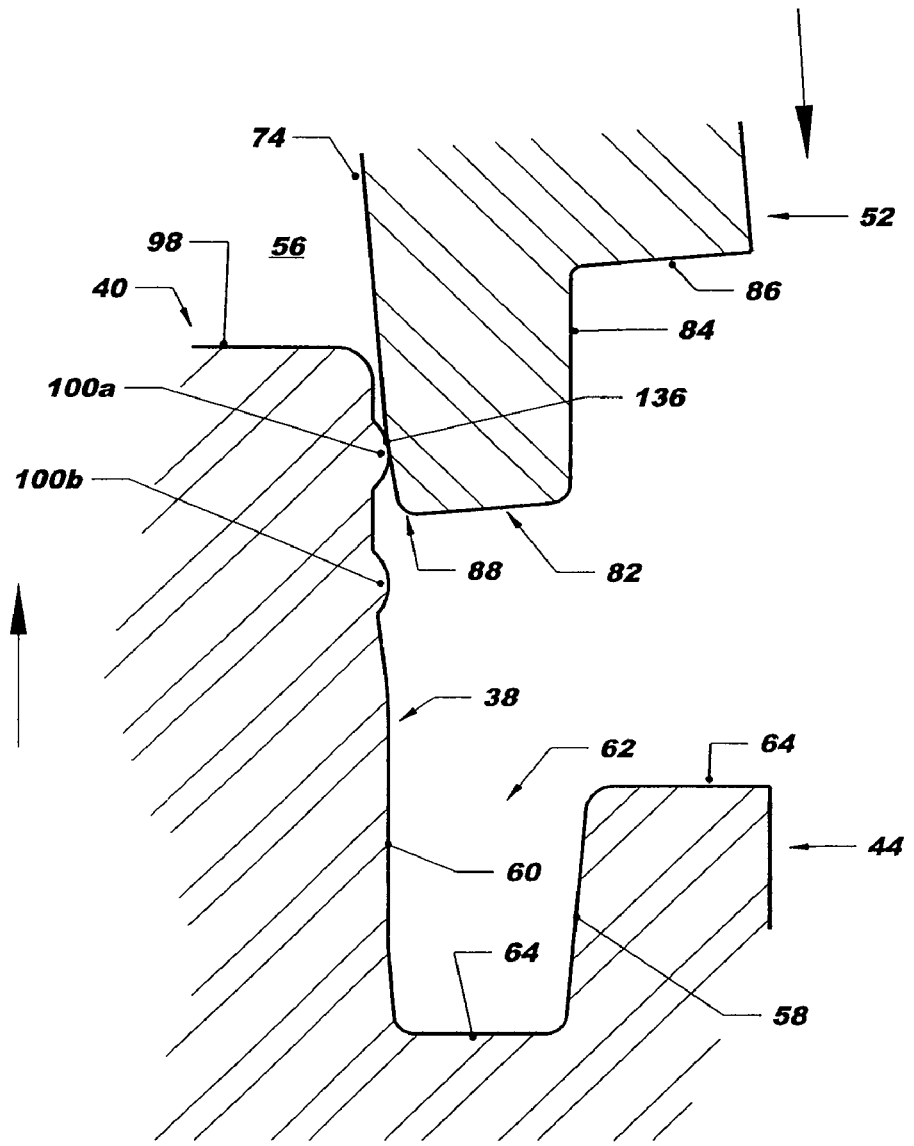
FIG. 15B illustrates a fragmentary elevation view of a portion of a second preferred nose embodiment.

While these bosses can be fixed, have an arcuate outer contour, and can be integrally formed as part of the nose 40, such as the integrally formed boss 100 depicted in FIG. 15B, each boss 100 can be an elongate roller 102, such as is shown in FIGS. 1-3, which functions as a rotatable bearing that rotates when engaging a corresponding socket-defining sidewall 74, 76 during mold lock operation during mold closure. In one preferred embodiment, each rotatable boss 100 is an elongate needle bearing roller 102 that rotates about an axis coming out of the page in FIG. 1. A cover plate 104 can be attached by a fastener 106 to the nose 40 in a manner where the plate 104 overlies an axial end of each such roller 102, capturing it in a complementary groove 108 (FIG. 3) or the like formed in the nose 40.

During seating of the nose 40 in the socket 56 during mold lock operation, each roller 102 can make contact with part of a corresponding socket sidewall 74, 76 adjacent the roller 102, with each contacting roller 102 rotating relative to the nose 40. As many rollers 102 can rotate as needed during seating of the nose 40 in the socket 56 with the rollers 102 speeding mating and alignment of the mold halves by reducing friction, which thereby also reduces the energy needed to bring the mold halves together while providing a positive interlock.

When the nose 40 is received far enough into the socket 56, the end wall 66 of each interlock flange 44, 46 abuts against end wall 86 of a corresponding arm 52, 54 of the receiver 34 preventing mold over travel. In addition, where equipped with a tapered outer wall segment 96, each tapered wall segment 96 contacts a portion of a corresponding inner socket-defining sidewall 74, 76 when the nose 40 is received far enough into the socket 56 such that an interference fit is created therebetween at or adjacent the rounded corner 88 of each wall 74, 76 that not only provides interlock but which also prevents over travel. Where also equipped with tapered walls 58 and 84, seating of the nose 40 in the socket 56 ultimately results in engagement between each pair of the walls 58 and 84 providing additional interlock and also preventing over travel. If desired, when the nose 40 is seated in the socket 56, the nose end wall 98 can abut against the socket end wall 78, also helping to accurately locate the mold halves by preventing over travel. Each of these end walls, namely the interlock flange end walls 66 and the receiver arm end walls 86, are located along the parting line face providing a matched parting line face for over travel protection.

In at least one preferred embodiment, the construction and arrangement of a mold lock 30 constructed in accordance with the present invention facilitates true positioning of at least one of the mold halves relative to at least the one other mold halves whereby a final lockup taper having 0.0000 (zero) error or misalignment is achieved. In another preferred embodiment, a final lockup taper having no greater than ±0.002 of an inch is achieved such that substantially true positioning is achieved.

A lock constructed in accordance with the present invention, such as the mold lock 30 shown in FIGS. 1-5, can be a side lock for releasable mounting along a side or side edge of a mold, such as a plastic injection mold. As previously discussed, the male interlock assembly 32 and the female interlock receiver 34 are each removably mounted to a side of a mold using a plurality of fasteners, each of which is a screw, bolt or the like, which extends through a corresponding one of the bores 70, 72. Of course, other types of mold lock mounting arrangements can be used, such as a round mold lock, a top lock, or the like, that are constructed and arranged in accordance with one or more aspects of the present invention.

Figure 6:
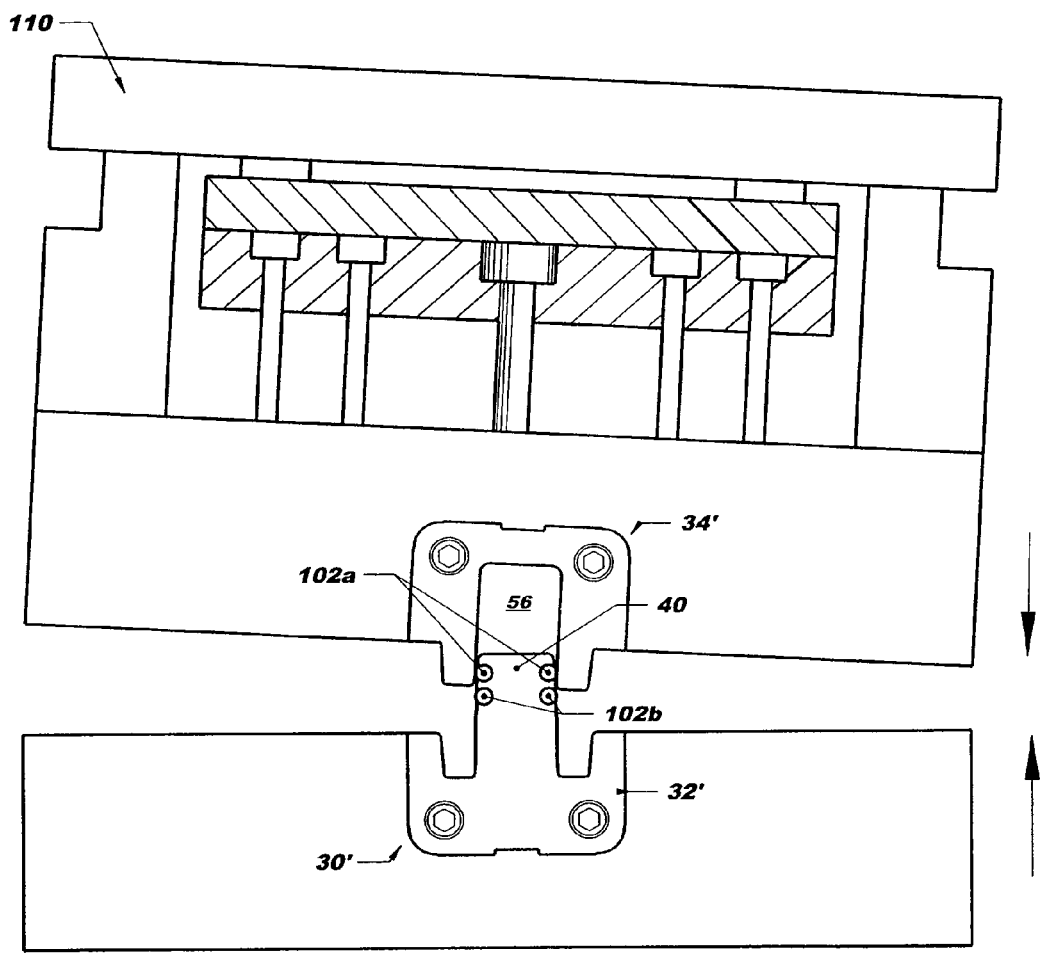
FIG. 6 illustrates a old with a mold lock disposed therein.

FIG. 6 illustrates a mold 110 that has two halves 112, 114 with relative motion therebetween helping to depict operation of a second preferred embodiment of a mold lock 30' constructed in accordance with the present invention. As the mold halves 112, 114 come together, there is a slight misalignment between the mold halves 112, 114 such that the head 38 and nose 40 of the male interlock assembly 32 is canted at an angle relative to the socket 56 in the female interlock receiver 34. During mold closing, contact between a first one of the rollers 102 on one side of the nose 40 and a corresponding socket-defining wall 74, 76, is tangential and creates a moment arm about the point of contact therebetween which helps bring the mold halves 112, 114 back into alignment with one another.

During mold closing, there is a first area of contact between one of the rollers 102 on one side of the nose 40 that is tangential with a corresponding socket-defining sidewall 74, 76 followed by a area region of contact with either one of the rollers 102 or a portion of the nose 40 disposed between the pair of rollers 102 on the other side of the nose 40 that can also be tangential but which in cooperation with each other initiates early interlocking of the nose 40 and head 38 within the socket 56. As a result of interlocking occurring earlier thereby aligning both mold halves 112, 114 earlier in the mold closure process, misalignment of opposing mold close-offs or shut-offs (not shown) is prevented such that scraping of mold close-offs or shut-offs during mold closure that occurred in the past with conventional prior art mold locks is substantially completely prevented.

Figure 7:
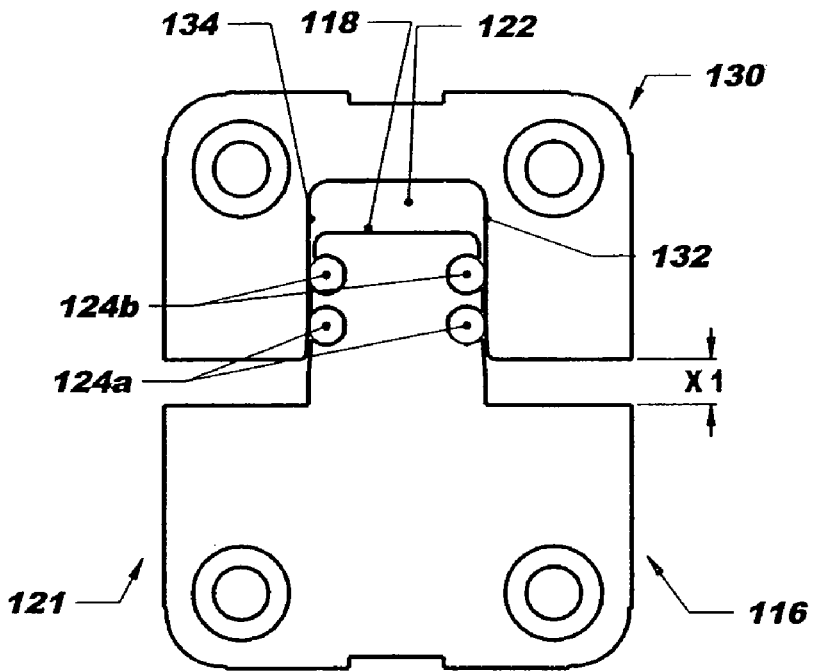
FIG. 7 illustrates an elevation view of a prior art mold lock during interlocking.
Figure 8:
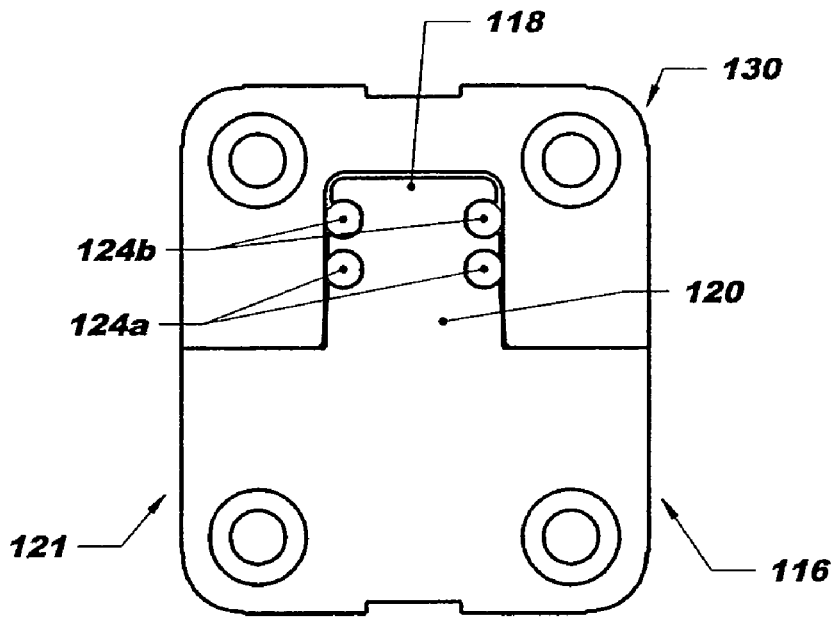
FIG. 8 illustrates a second elevation view of the prior art mold lock of FIG. 7.

FIGS. 7 and 8 illustrate interlocking of a conventional prior art mold lock 116 to demonstrate its lesser tolerance misalignment capabilities as well as to show that it requires greater depth of insertion of the nose 118 and head 120 of the male interlock portion 121 into the socket 122 before interlocking actually occurs. As is shown in FIG. 7, interlocking does not take place until after the last roller bearing 102b of the nose 118 passes beyond a corresponding socket-defining wall 126, 128 of the female receiver 130. As a result, the mold halves (not shown in FIGS. 7 and 8) are spaced very close to each other, namely by a distance, $X_1$, when actual interlocking occurs, which is very small such that clashing or scraping of mold close-offs or shut-offs (not shown) can disadvantageously occur. For example, as is shown in FIG. 7, $X_1$ is a distance that is approximately equal to no more than one third of the total length of the nose 118 and head 120 combined.

In addition, because this conventional prior art mold lock 116 lacks any secondary tapered interlock and because there is virtually no clearance or tolerance between the nose 118 and the corresponding socket-defining sidewalls 132, 134, a conventional prior art mold lock is only able to provide less than 1° of mold misalignment compensation. In other words, where the angle of one mold half relative to another mold half is greater than 1° as relative movement therebetween occurs during mold closure, interlocking of the mold lock 116 cannot occur such that the molding cycle cannot be completed and damage can occur not only to the mold lock 116 but to other portions of the mold itself.

FIGS. 9-14 illustrate a preferred embodiment of a mold lock 30' that is similar to the embodiment shown in FIGS. 1-3 but which can slightly taper the outer sidewall 60 of the head such as in the manner depicted to increase contact surface area with socket-defining walls 74, 76 during interlock. Thus, tapered wall segment 96 can be eliminated because they essentially have been extended along the entire length of each head sidewall 60. For example, in the preferred mold lock embodiment shown in FIGS. 9-14, each tapered wall segment 96 is not present.

In addition, the width of the nose 40 has been decreased so it is less than the width between the head sidewalls 60 at or adjacent where the walls 60 meet the nose 40. As a result, a mold lock 30' constructed in accordance with the present invention provides improved interlocking that is better able to resist side thrust forces during mold closing due to the increased interlock contact surface area. Moreover, such a mold lock 30' constructed in accordance with the present invention also is more tolerant of mold misalignment during mold closing due to the increased clearance between each side of the nose 40 and the corresponding socket-defining sidewall 74, 76 adjacent the mouth or entrance of the socket 56.

Finally, the nose 40 of the mold lock 30' only has a pair of bosses 100a, 100b or rollers 102a, 102b on each side of the nose 40. As will be discussed in more detail below, the bosses 100a, 100b or rollers 102a, 102b are spaced apart a distance that initiates initial contact with one set of rollers 102a with the socket-defining walls 74, 76 such that subsequent contact with the other set of rollers 102b during mold closure very quickly brings the mold halves into alignment thereby preventing or at least minimizing clashing or scraping of mold components, such as close-offs, shut-offs, or the like, which can occur if the mold halves are not aligned well before mold closure is complete.

Even where the outer sidewall 60 of the head 38 is not slightly outwardly tapered, each boss 100 or roller 102 adjacent the nose end wall 98 is slightly recessed so as to provide at least a 1/10 of an inch tolerance or clearance with a corresponding adjacent socket-defining wall 74, 76 adjacent the top corner 88 of each wall 74, 76 to facilitate interlocking in the presence of mold misalignment of as much as 5°. In a preferred embodiment shown in FIGS. 9-14, the boss 100a or roller 102a located adjacent the nose end wall 98 is sufficiently recessed so as to provide between a 1/10 of an inch tolerance or clearance and a 3/10 of an inch tolerance or clearance. In the preferred embodiment shown in FIGS. 9-14, the boss 100*a* or roller 102*a* located adjacent the nose end wall 98 is recessed or offset so as to provide about 2/10 of an inch tolerance or clearance.

As is shown in FIGS. 9-14, there is a pair of bosses, each of which can be a roller 102*a*, 102*b*, located on each side of the nose 40 that are each configured to provide at least a 1/10 of an inch tolerance or clearance with a corresponding adjacent socket-defining wall 74, 76 adjacent the top corner 88 of each wall 74, 76. Each roller 102*a*, 102*b* of each pair is recessed sufficiently so as to provide a clearance of between 1/10 of an inch and 3/10 of an inch. In a preferred embodiment, the rollers 102*a*, 102*b* are recessed sufficiently to provide about 2/10 of an inch tolerance or clearance.

Figure 9:
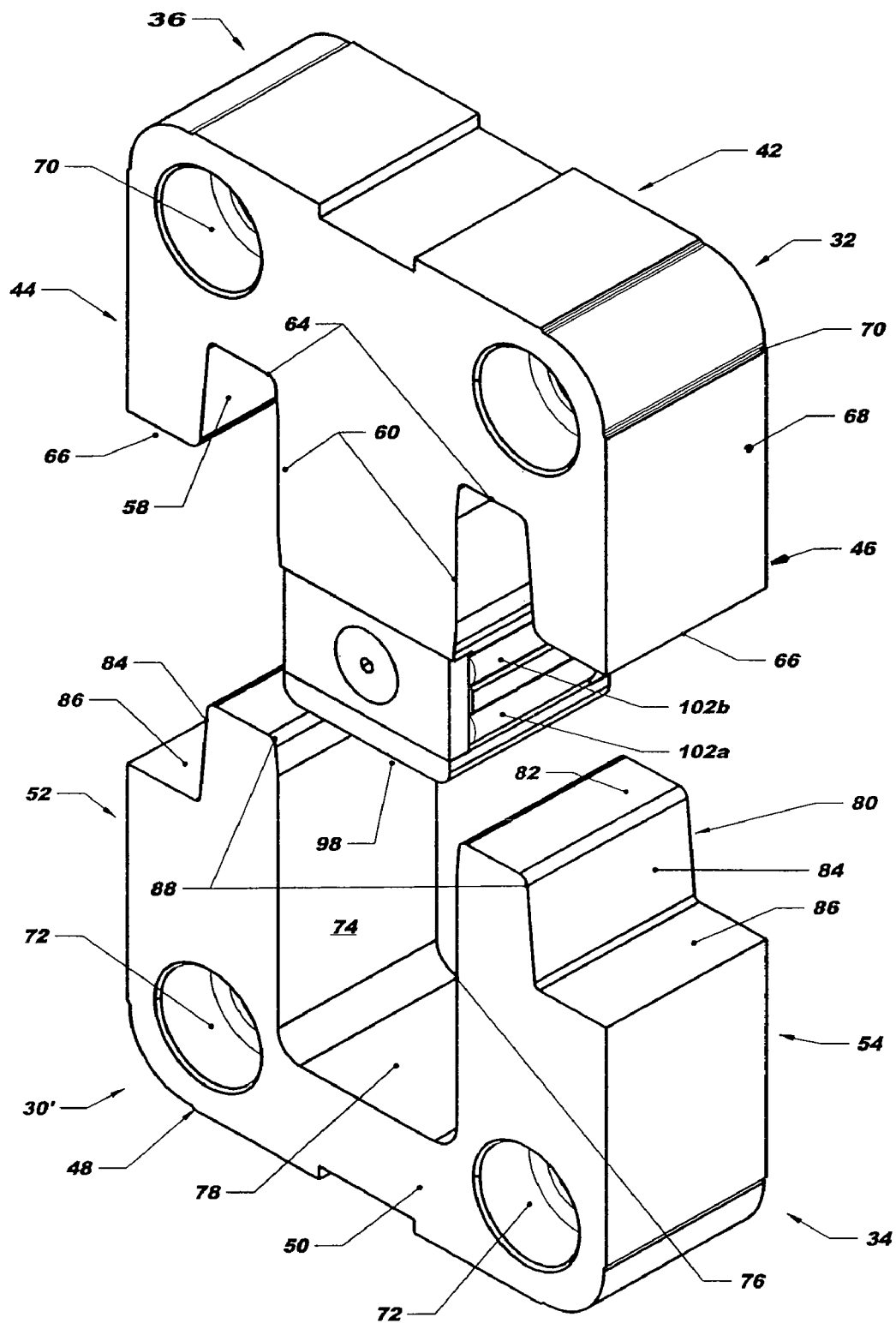
FIG. 9 illustrates a perspective view of a second preferred mold lock embodiment constructed in accordance with the present invention.
Figure 10:
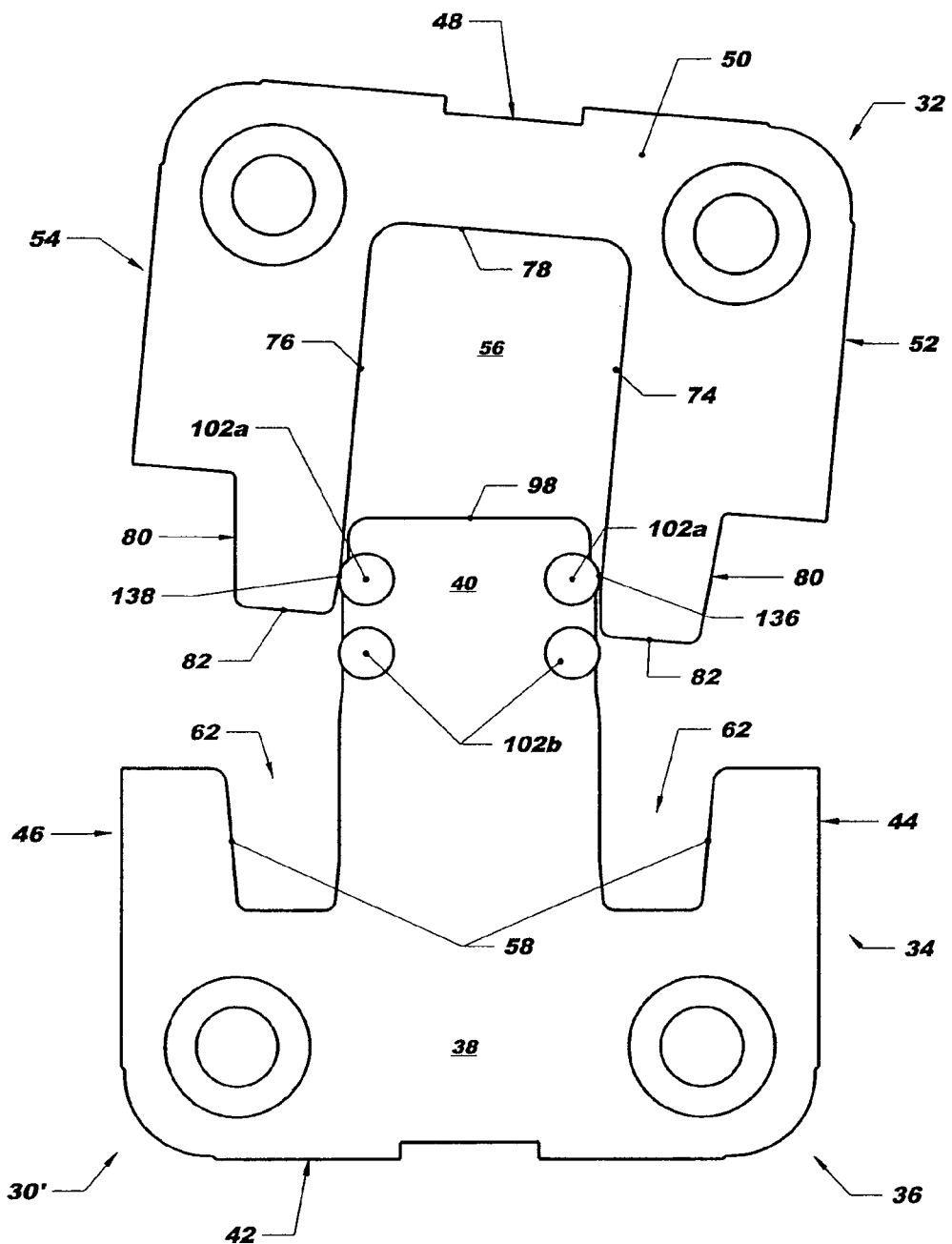
FIG. 10 illustrates an elevation view of the mold lock shown in FIG. 9.
Figure 11:
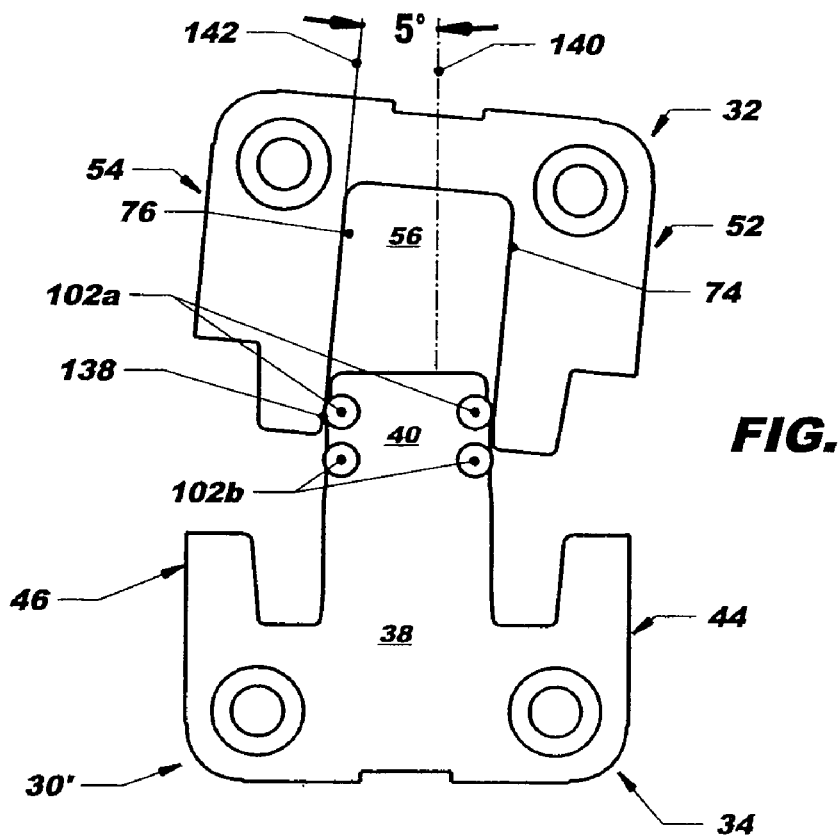
FIG. 11 illustrates an elevation view of the mold lock shown in FIG. 9 during interlocking initiation.

FIG. 9 illustrates the mold lock 30' with the nose 40 of the male interlock assembly 32 generally overlying the mouth or entrance of the socket 56, such as is the case prior to or very early during mold closing. FIG. 10 illustrates initial contact between the nose 40 and an adjacent socket-defining wall 74, 76 at a single point of contact 136, 138 when the mold halves are close enough where contact is initiated between the male interlock assembly 32 and the female interlock receiver 34. At this point, mold misalignment is at or near a maximum but rapidly decreasing due to engagement between the male interlock assembly 32 and the female interlock receiver 34. FIG. 11 illustrates contact between the nose 40 and both socket-defining sidewalls 74, 76 where there is one contact point 136 therebetween on one side of the nose 40 and there is one contact point 138 therebetween on the other side of the nose 40. The distance between the two points of contact 136, 138 is the same no matter where the two initial points of contact are made between the nose 40, e.g., rollers 102*a*, and the corresponding socket-defining walls 74, 76. As is shown in FIG. 11, mold misalignment is approximately 5° such that the angle formed between a centerline 140 extending through the head 38 and nose 40 and a line 142 that is substantially parallel to one of the socket-defining sidewalls 76 is about 5°.

Figure 12:
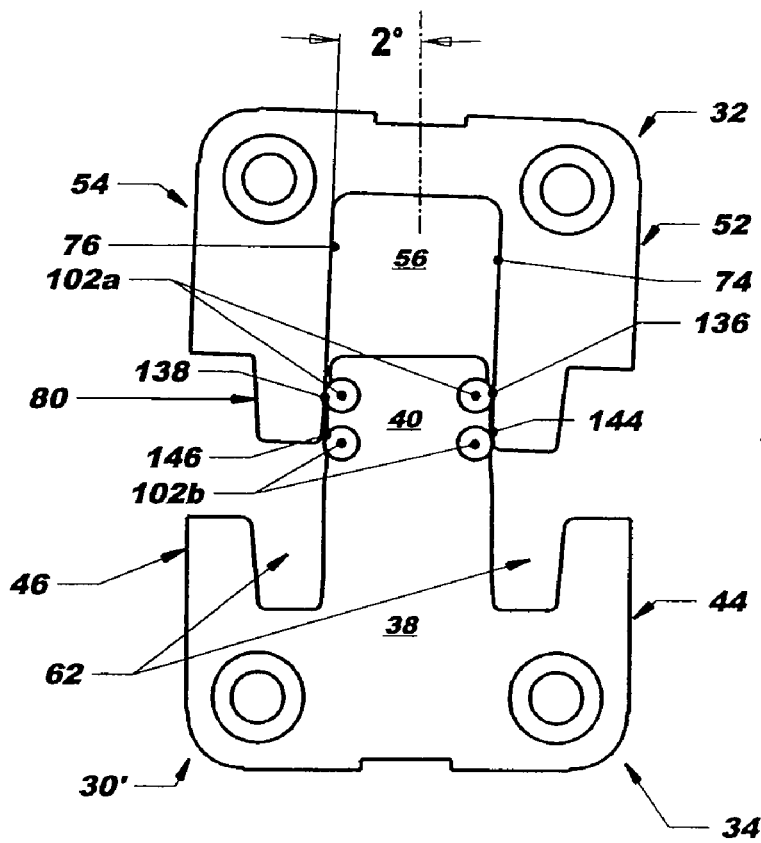
FIG. 12 illustrates an elevation view of the mold lock shown in FIG. 9 completing the initial interlocking.

As the mold further closes, this misalignment becomes less as interlocking occurs. For example, as is shown in FIG. 12, engagement between both rollers 102*a*, 102*b* on both sides of the nose 40 and a corresponding one of the socket defining sidewalls 74, 76 creates a moment that counteracts thrust tending to cause mold misalignment thereby bringing the mold halves in alignment or closer in alignment. This occurs because further insertion of the nose 40 into the socket 56 causes a second point of contact 144, 146 to be created on either side of the nose between the nose and a corresponding one of the socket-defining sidewalls. For example, as is shown in FIG. 12, tangential contact is made between the nose 40 and a corresponding socket-defining sidewall 74, 76 at two points 136, 144, and 138, 146 on either side of the nose 40 with one of the contact points 136, 138 on each side being in contact with a first roller 102*a* of the nose 40 and the other one of the contact points 144, 146 being contact with a second roller 102*b* of the nose 40. The arcuate or rounded outer roller surface facilitates making line contact with a corresponding socket-defining sidewall while also preventing cam locking during engagement. As previously mentioned, because each roller 102*a*, 102*b* is rotatable, friction is reduced during interlocking thereby making it easier to correct mold misalignment during mold closing.

Figure 13:
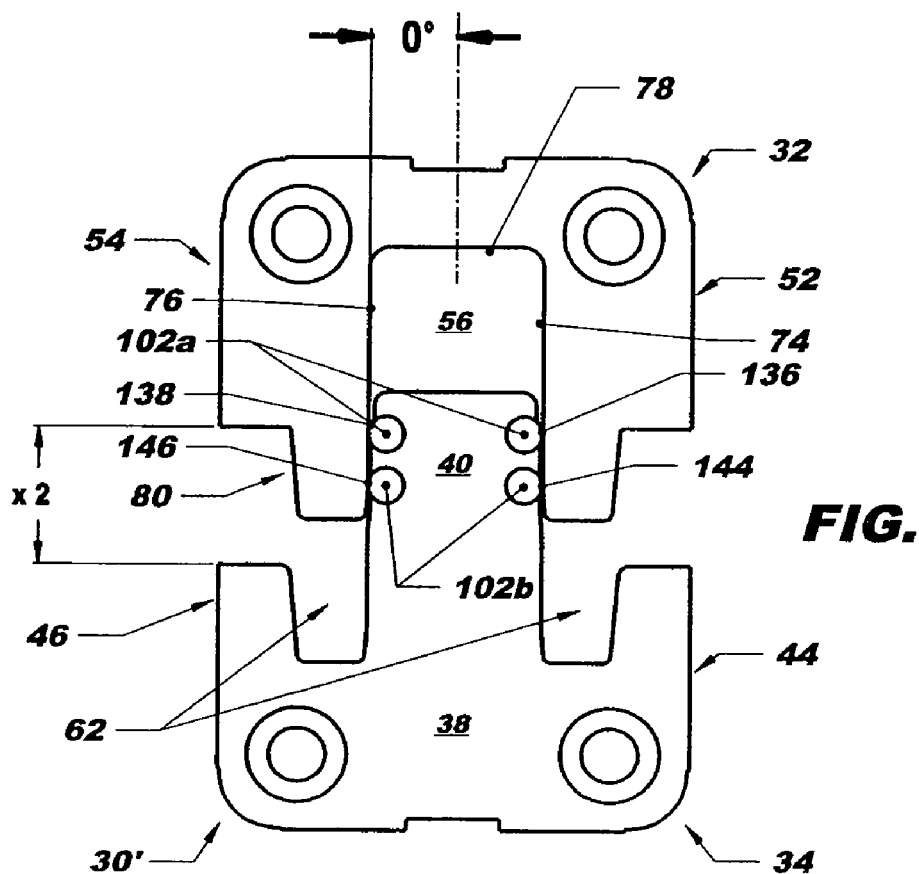
FIG. 13 illustrates an elevation view of the mold lock shown in FIG. 9 after initial interlocking is complete.

With reference to FIG. 13, as the mold closes even further, initial interlocking is achieved resulting from the two points of contact 136, 144, and 138, 146 on either side of the nose 40 with a corresponding socket-defining sidewall 74, 76 in aligning the mold halves such that there is approximately 0° misalignment between the mold halves. As is shown in FIG. 13, this initial interlocking is achieved relatively early during the mold closing process such that close-off alignment is also achieved well before any clashing or scraping can occur. For example, initial interlocking occurs when the mold halves are spaced a distance, $X_2$, from each other that is greater than one third the length of the head 38 plus the nose 40. In the preferred mold lock embodiment illustrated in FIG. 13, $X_2$ is between one third and one half length of the head 38 plus the nose 40.

Figure 14:
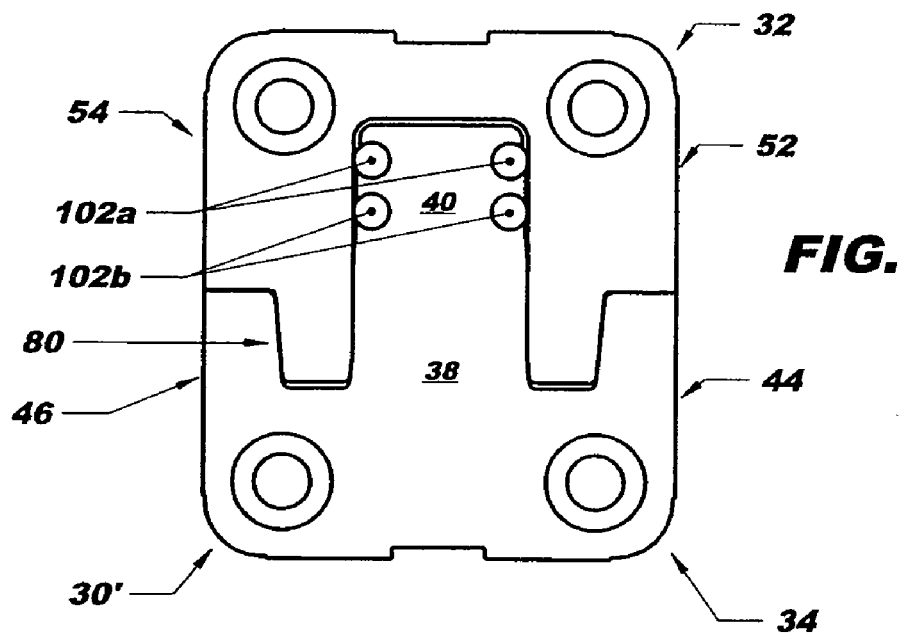
FIG. 14 illustrates an elevation view of the mold lock shown in FIG. 9 after completion of interlocking.

As the mold closes even further, secondary interlocking occurs between each interlock projection 80 and the corresponding interlock channel 62 as each interlock projection 80 seats in its corresponding interlock channel 62, such as in the manner depicted in FIG. 14, more positively aligning the closed mold halves. In addition, primary interlocking resulting from the receipt of the nose 40 and the head 38 fully seating in the socket 56 also positively aligns the closed mold halves. As a result, a final lockup taper having 0.0000 (zero) error or misalignment can be achieved all while minimizing and preferably preventing clashing or scraping of close-offs and the like that frequently occurred when using conventional prior art mold locks because initial close-off damage preventing phase interlocking is advantageously achieved prior to mold closing and before close-off clashing or scraping can occur.

FIGS. 15A-17 illustrates interlocking of both the primary interlock and one of the secondary interlocks in more detail. As is shown in FIG. 15A, each roller 102*a*, 102*b* is slightly recessed or offset by an amount sufficient to accommodate it least 5° of mold misalignment with the upper roller 102*a* making a first point of contact 136 with part of the socket-defining wall 74 adjacent corner 88 with the point of contact 136 being tangential in nature relative to roller 102*a*. FIG. 15A is similar to the one or both of FIGS. 10 and 11 where initial contact 136 has occurred between the nose 40 of the male interlock assembly 32 and the female interlock receiver 34 as the nose 40 enters the socket 56.

FIG. 15B illustrates a nose configuration having a pair of spaced apart bosses 100*a*, 100*b* on each side of the nose 40 with each boss 100*a*, 100*b* being a nib that is integrally formed of or with the nose. Where the bosses 100*a*, 100*b* are integrally formed, each boss 100*a*, 100*b* can be hardened to a hardness greater than the hardness of a corresponding socket-defining sidewall 74, 76 with which it will come into contact during interlocking during mold closure. In a preferred embodiment, each such integrally formed boss 100*a*, 100*b* is hardened to a hardness of 70-80 Rockwell with the hardness of the outer surface of each socket-defining sidewall 74, 76 having a lower hardness.

Figure 16:
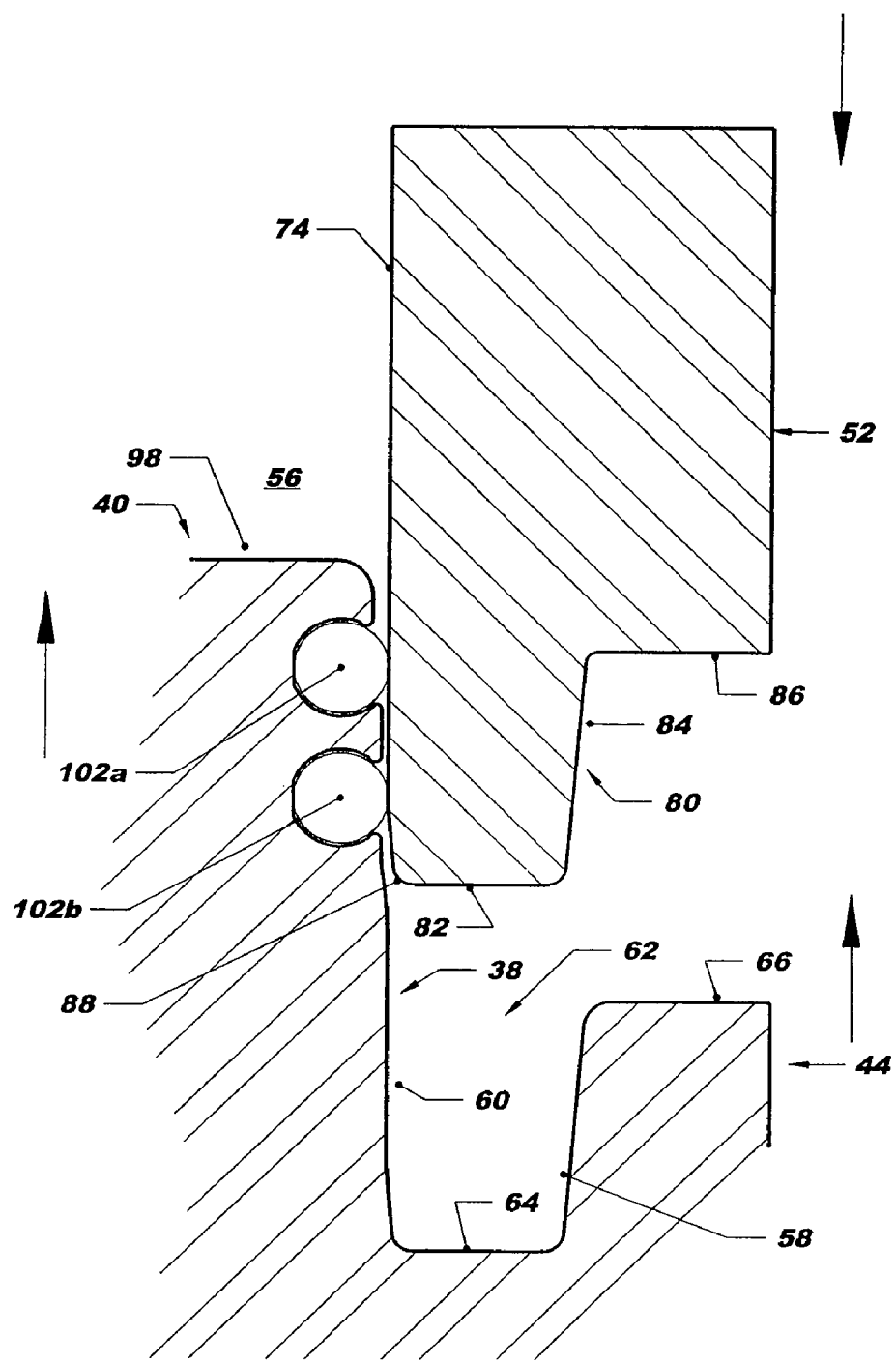
FIG. 16 illustrates a fragmentary elevation view of a portion of the mold lock depicted in FIG. 9 during initial interlocking.

When a single point 136, 138 of contact between the nose 40 and each socket-defining wall 74, 76 occurs, such as is also depicted in FIGS. 10 and 11, further insertion of the nose 40 and the head 38 into the socket 56 creates a second contact point 144, 146 spaced from the first contact point 136, 138 thereby causing a moment to be created that counters any thrust of the mold halves due to misalignment, which helps bring the mold halves into alignment. With reference to FIG. 16, further movement of the nose 40 into the socket 56 establishes two points 136, 144 of contact on each side with each point of contact being between a roller 102*a*, 102*b* and the outer surface of a corresponding socket-defining sidewall 74, 76. At this point, initial interlocking is achieved substantially aligning any close-offs so that the close-offs will not clash or scrape as the mold halves further come together. This also achieves substantially complete alignment of the mold halves.

Figure 17:
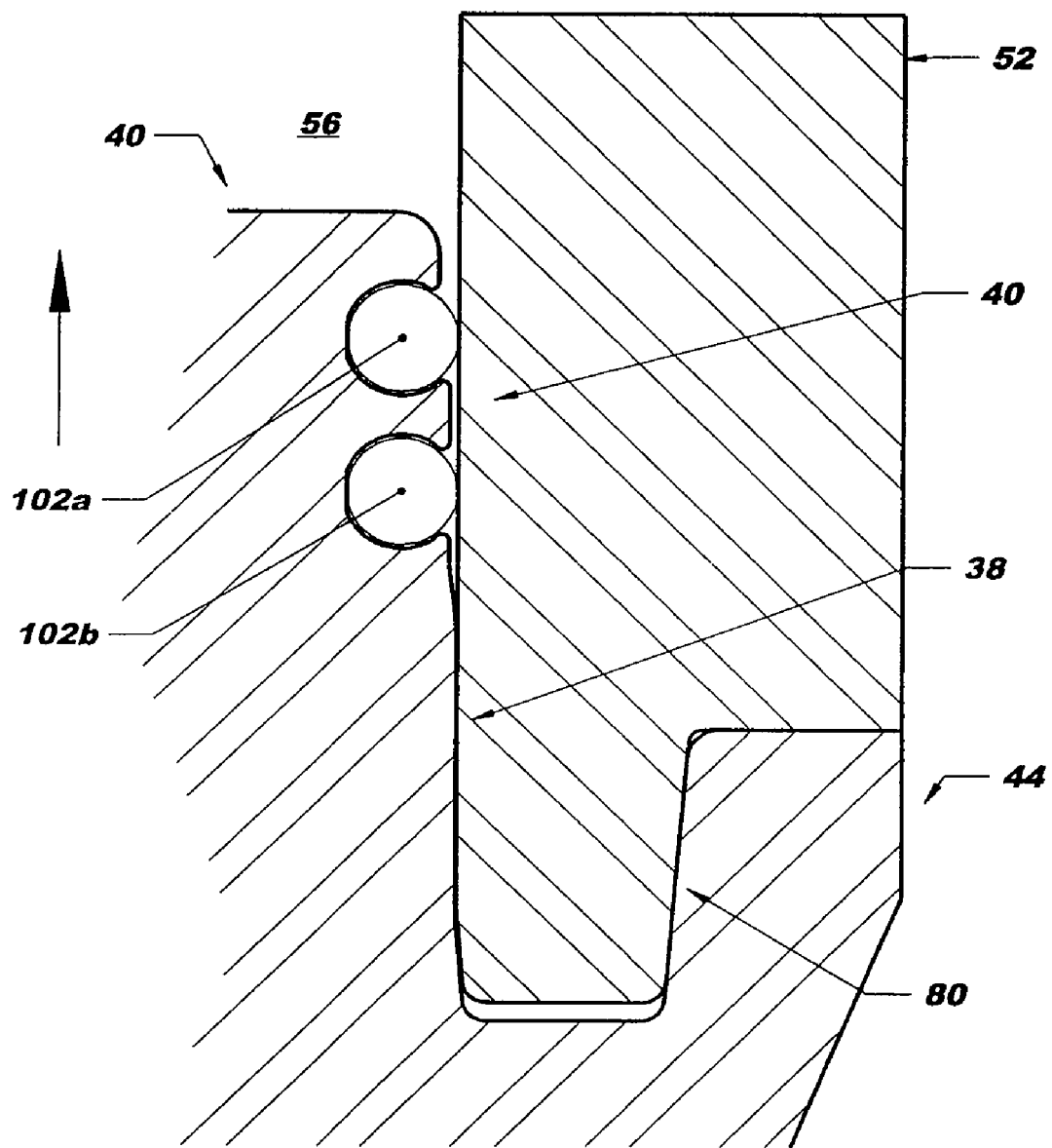
FIG. 17 illustrates a fragmentary elevation view of a portion of the mold lock depicted in FIG. 9 after completion of interlocking.

With reference to FIG. 17, the nose 40 and head 38 are completely seated in the socket 56 and each secondary interlock is also established because each interlock projection 80 is seated in its corresponding interlock channel 62. As is also shown in FIG. 17, each flange end wall 66 abuts a corresponding arm end wall 86 preventing the mold halves from moving toward one another establishing alignment along their mating interface or interfaces. In addition, the outer sidewall 84 of each interlock projection 80 abuts against a corresponding inner flange sidewall 58 thereby opposing any side-to-side thrust being exhibited by either mold half during closure from adversely impacting mold alignment. Each set of mating sidewalls 58, 84 are inclined so as to maximize their surface area of contact between them when secondary interlocking has been achieved. Side-to-side thrust of the mold halves is also opposed by engagement of the head sidewalls 60 with a corresponding one of the socket-defining sidewalls 74, 76.

Figure 18:
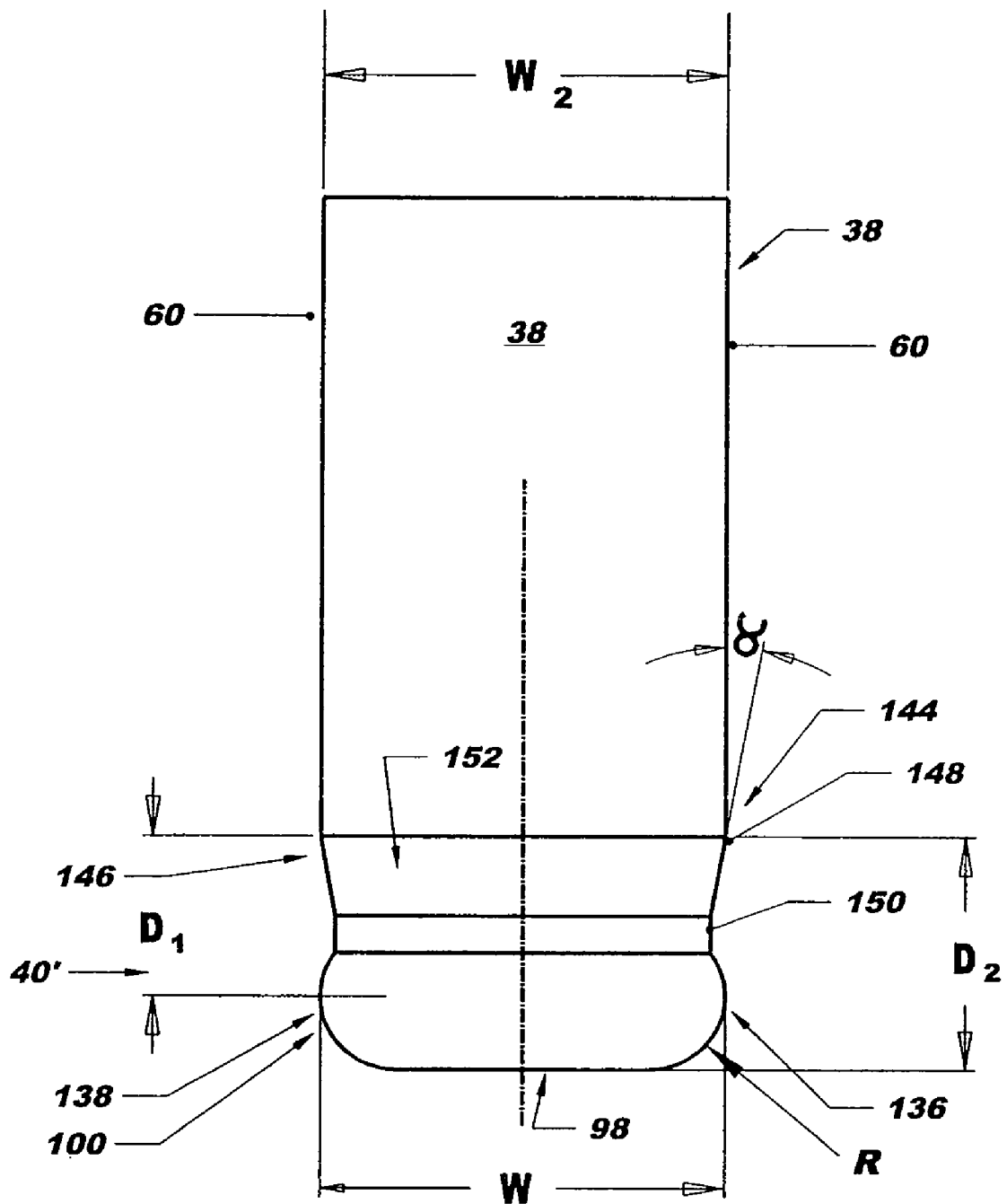
FIG. 18 illustrates a preferred embodiment of a head and nose of a male interlock arrangement constructed in accordance with the present invention.
Figure 19:
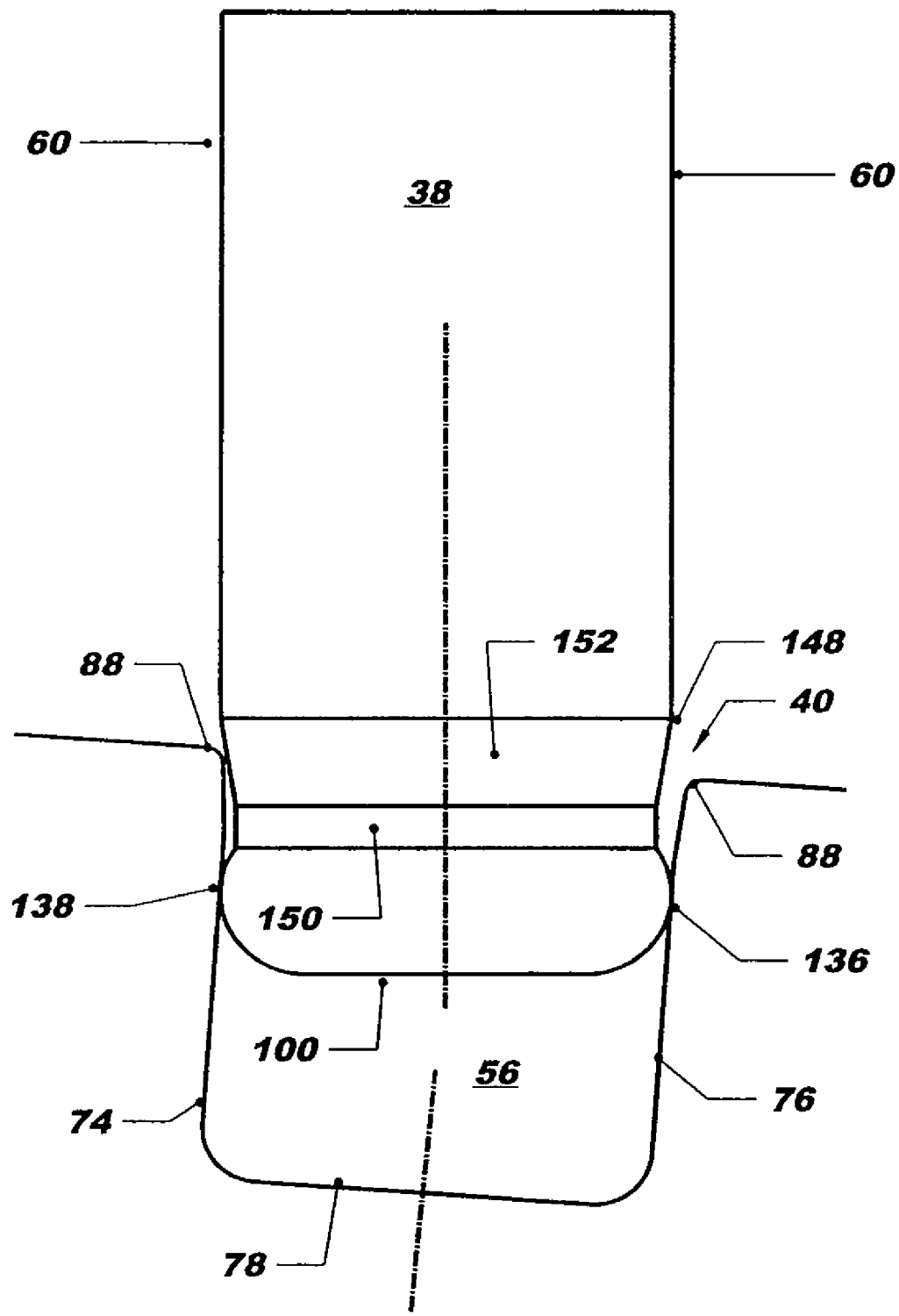
FIG. 19 illustrates the head and nose embodiment during initiation of interlocking.
Figure 20:
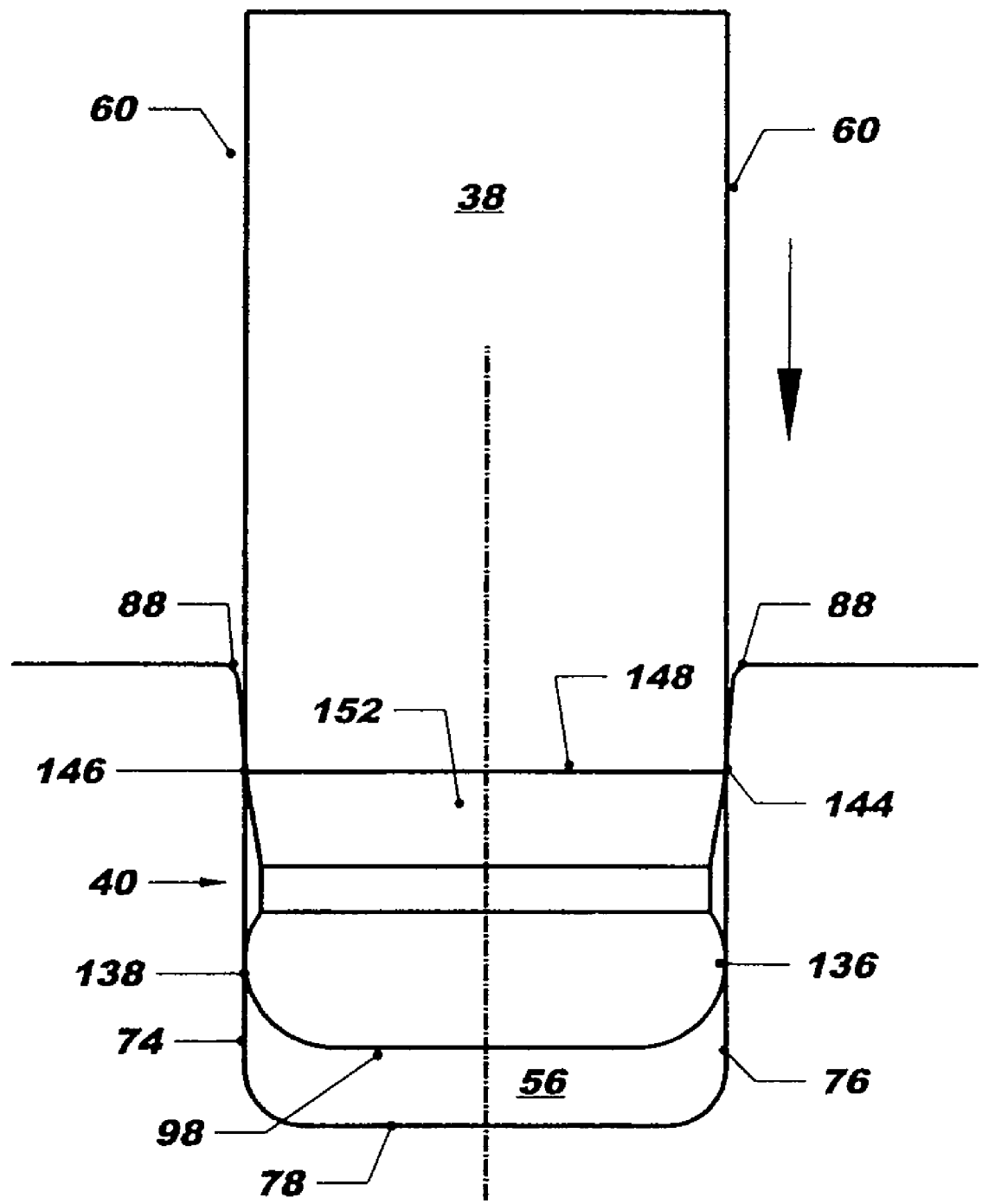
FIG. 20 illustrates the head and nose embodiment after completion of interlocking.

FIGS. 18-20 illustrate another preferred embodiment of a nose 40' that extends outwardly from a head 38 of a male interlock assembly that is constructed in accordance with the present invention. An example is shown in FIG. 18. The nose 40 has a rounded boss 100 formed at its front end that has a rounded outer contour with a radius of curvature, R, which is approximately 0.2 inches in the depicted embodiment. The nose 40 has a width, W, that is approximately one inch in the depicted embodiment. The points 136, 138, 144, 146 where the nose 40 is intended to make contact with a part of a corresponding one of the socket-defining walls 74, 76 are spaced apart by a distance, D1, that is about 0.4 inches and the farthest contact point from the end 98 of the nose 40 is spaced apart by a distance, D2, which is about 0.60 inches in the depicted embodiment.

FIG. 18 also illustrates a desired relationship between the width, $W_1$, of the nose 40 at its free end (at or adjacent the outer peripheral edge of the boss 100 located closest to nose end wall 98) and the distance, $D_2$, from the nose end wall 98 to the second contact point. In a preferred embodiment, the ratio of nose width, $W_1$, to second contact point distance, $D_2$, is between 1.5 and 1.75. In a currently preferred embodiment, the ratio $W_1/D_2$ is about 1.6. When a nose 40 and/or head 38 is configured to meet this ratio, contact with the second contact point ensures preliminary interlocking occurs early enough during mold closure that close-off clashing and scraping is prevented. It also ensures good mold alignment for completion of the primary interlocking operation between the nose 40 and/or head 38 and the socket 56. as well as for completion of each secondary interlocking operation between each interlock projection 80 and corresponding interlock channel 62.

Where the nose 40 is equipped with a fixed boss 100 or roller 102 at the second contact point 144, 146, such as is in the case of the nose 40 shown in FIG. 15A or 15B, this ratio range and/or ratio is also applicable. This ratio range and/or ratio also holds true where both contact points 136, 138, 144, 146 are fixed bosses 100, rollers 102, or a combination thereof.

As is shown in FIG. 18, the nose 40 is necked down slightly relative to the head 38 such that its width, $W_1$, is less than the width, $W_2$, of the head 38, providing a desired amount of clearance or tolerance to compensate for mold misalignment in the manner discussed above. As previously mentioned, at least 0.1 inch of tolerance or clearance is provided on either side of the nose 40 at or adjacent its end wall 98 and preferably about a 0.2 inch tolerance or clearance is provided. The boss 100 located adjacent the free end 98 of the nose 40 has a radius of curvature, R, sufficient to prevent cam locking during contact with a corresponding socket-defining sidewall 74, 76 during interlocking. While the second contact point is located at or adjacent a line or annular band 148 that is spaced from a necked down region 150 located rearwardly of boss 100, it can also be a boss, like boss 100, but spaced from boss 100 a distance of $D_1$ from a center of boss 100 and spaced a distance of $D_2$ from the nose end wall 98. The necked down region 150 facilitates point or line contact, e.g., tangential contact, between an adjacent corresponding socket-defining sidewall 74, 76 as it can help provide clearance to facilitate entry of the nose 40 into the socket 56 when mold misalignment is extreme.

An inclined annular band 152 extends from the necked down region 150 to or adjacent the line or annular band 148 in the manner shown in FIG. 18. This inclined annular band 152 forms an acute included angle, T, with head sidewall 60 that is no greater than about 30°. In a preferred embodiment, the angle, T, is about 10°. This inclined annular band 148 also helps facilitate clearance and mold misalignment tolerance compensation.

These points of contact will not be located in exactly the same place every time because mold misalignment changes from one molding cycle to the next and from one mold to the next. Rather, they can be located anywhere along the curved surface of boss 100 and/or adjacent the annular band including at the junction formed where sidewall 60 and annular band meet.

As is shown in FIG. 18, the width of the rearward most located contact point 144, 146 can be and typically is greater than the width, $W_1$, of the forwardly located boss 100, but can have substantially the same width as $W_1$ if desired. In a preferred embodiment, the greater width of the rearward most located contact point 144, 146 advantageously helps speed interlocking when it comes into contact with a corresponding adjacent socket-defining sidewall 74, 76 by creating a moment in combination with the first contact point 136, 138 between boss 100 and corresponding socket-defining sidewall 74, 76 that counters any mold misalignment offsetting thrust to bring the mold halves into alignment well before the mold halves mate.

FIGS. 19 and 20 illustrate operation of a head 38 of a male interlock assembly having a nose configuration as depicted in FIG. 18 that facilitates rapid interlocking between the nose 40 and head 38 and a socket 56 in a female interlock receiver 34. With specific reference to FIG. 19, there is a point of contact 136, 138 on each side between the boss 100 and a corresponding socket-defining sidewall 74, 76. With specific reference to FIG. 20, as a top corner 88 of one or both socket-defining sidewall 74, 76 contacts any portion of the inclined annular band 152 or wall 60 at junction 148, it causes the head 38 to rotate in a direction opposite the initial point of contact therebetween thereby bringing the mold halves into better alignment during mold closure. Once engagement occurs between the outer wall 60 of the head 38 and each socket-defining sidewall 74, 76, e.g., such as at the rearward most contact point, initial interlocking is complete. Thereafter, although not shown in FIGS. 19 and 20, further insertion of the nose 40 in the head 38 into the socket 56 completes the mold interlocking process. Where equipped with one or more secondary interlocks, each secondary interlock is achieved as mold closure is completed.

It is understood that the various preferred embodiments are shown and described above to illustrate different possible features of the invention and the varying ways in which these features may be combined. Apart from combining the different features of the above embodiments in varying ways, other modifications are also considered to be within the scope of the invention.

I claim:

1. A mold lock for a mold that has a plurality of mold halves comprising a plurality of interlock arrangements, the mold lock comprised of (a) a female interlock arrangement having (i) a socket formed therein and (ii) at least one interlock projection extending outwardly therefrom, and (b) a male interlock arrangement having (i) an outwardly extending head that seats in the female interlock arrangement socket during closing of the mold providing a first interlock and (ii) an interlock channel formed therein in which the at least one interlock projection seats during closing of the mold providing a second interlock.

2. The mold lock of claim 1 wherein the female interlock arrangement has a plurality of spaced apart interlock projections extending outwardly therefrom and the male interlock arrangement has a plurality of spaced apart interlock channels formed therein that each seat a corresponding one of the interlock projections.

3. The mold lock of claim 2 wherein one of the interlock projections is disposed on one side of the socket formed in the female interlock arrangement and the other one of the interlock projections is disposed on the other side of the socket formed in the female interlock arrangement and wherein one of the interlock channels formed in the male interlock arrangement is disposed on one side of the interlock head and the other one of the interlock channels formed in the male interlock arrangement is disposed on the other side of the interlock head.

4. The mold lock of claim 3 wherein the female interlock arrangement comprises a generally U-shaped body and the male interlock arrangement comprises a generally W-shaped body.

5. The mold lock of claim 1 wherein the socket of the female interlock arrangement is defined by a pair of arms and the male interlock arrangement comprises a nose at the free end of the head that makes initial interlocking engagement with one or both of the arms defining the socket when the mold halves are spaced from one another a distance that is between one third and one half the combined length of the head and nose during closing of the mold.

6. The mold lock of claim 1 wherein the socket is defined by at least one arm and the head comprises a nose carried by the free end of the head that includes at least one outwardly extending boss that engages a portion of the at least one arm when the nose is seating in the socket during mold closure.

7. The mold lock of claim 6 wherein the at least one boss has a rounded outer surface.

8. The mold lock of claim 7 wherein the at least one boss is inwardly offset relative to an adjacent portion of an outer sidewall of the head enabling engagement with an adjacent portion of the at least one arm when the nose is seating in the socket in a manner that compensates for misalignment between the mold halves during mold closure.

9. The mold lock of claim 7 wherein the at least one boss comprises a rotatable, elongate roller.

10. The mold lock of claim 7 wherein the at least one boss is inwardly offset relative to an adjacent portion of an outer sidewall of the head providing clearance with a corresponding adjacent portion of the at least one arm enabling engagement with the at least one arm when the nose is seating in the socket in a manner that compensates for as much as 5° misalignment between the mold halves during mold closure.

11. The mold lock of claim 10 wherein there is at least 0.1 inch clearance between the at least one boss and an adjacent portion of the at least one arm disposed at or adjacent a mouth or opening of the socket.

12. The mold lock of claim 11 wherein there is between a 0.1 inch clearance and a 0.3 inch clearance between the at least one boss and the adjacent portion of the at least one arm.

13. The mold lock of claim 12 wherein the socket is defined by a pair of spaced apart arms, the nose has a pair of oppositely extending bosses, and there is about 0.2 inch clearance between each boss and an adjacent one of the arms.

14. The mold lock of claim 1 wherein the socket of the female interlock arrangement is defined by a pair of arms and the head of the male interlock arrangement comprises a nose disposed at its free end that includes a pair of socket arm contacts with one of the socket arm contacts disposed adjacent a free end of the nose and the other one of the socket arm contacts disposed a distance from the free end of the nose that results in a ratio of the width of the nose to the distance from the free end of the nose of between 1.5 and 1.75.

15. The mold lock of claim 14 wherein the ratio is about 1.6.

16. The mold lock of claim 14 wherein at least one of the socket arm contacts comprises a boss that has a rounded outer contour.

17. The mold lock of claim 1 wherein the socket comprises a sidewall having a first tapered portion along a mouth of the socket and the interlock head comprises a sidewall having a second tapered portion that is substantially complementary with the first tapered portion.

18. The mold lock of claim 1 wherein the at least one interlock projection of the female interlock arrangement comprises a first mating surface acutely inclined relative to a longitudinally extending centerline of the socket, wherein the interlock channel is defined by a second mating surface spaced from the head of the male interlock arrangement acutely inclined relative to a longitudinally extending centerline of the head, and wherein the first and second mating surfaces are substantially complementarily inclined with one another.

19. The mold lock of claim 1 wherein the interlock channel is defined by a pair of spaced apart sidewalls.

20. The mold lock of claim 19 wherein the interlock channel is further defined by an endwall extending between the sidewalls.

21. A mold lock for a mold that has a plurality of mold halves, the mold lock comprising a pair of interlock arrangements wherein one of the interlock arrangements comprises a female interlock arrangement having a socket formed therein defined by a base and a pair of outwardly extending and generally parallel arms with at least one arm comprising a flange extending outwardly from its free end that defines an interlock projection and wherein the other one of the interlock arrangements comprises male interlock arrangement having an elongate head projecting outwardly from a base with the head receivable in the socket during mold closing defining a first interlock and including at least one flange extending from the base outwardly generally parallel to the head and spaced from the head so as to define an interlock channel therewith that receives the interlock projection therein during mold closing defining a second interlock.

22. The mold lock of claim 21 wherein the interlock projection flange has an end wall and an inclined sidewall and the interlock channel defining flange has an end wall and an inclined sidewall that engages the inclined sidewall of the interlock projection flange during interlocking during mold closing providing a tapered interlock surface therebetween.

23. The mold lock of claim 22 wherein the arm of the female interlock arrangement that carries the interlock projection flange has an end wall disposed adjacent to the inclined interlock projection flange sidewall that abuts against the interlock channel defining flange end wall during mold closure.

24. The mold lock of claim 21 wherein the head is defined by a pair of generally parallel sidewalls that extend outwardly from the base with each head sidewall having a tapered sidewall segment that extends to or adjacent the base and wherein each tapered sidewall segment of the head engages a corresponding one of the arms when the head is fully seated in the socket providing a tapered interlock surface therebetween.

25. The mold lock of claim 24 wherein the head further comprises a nose at its free end that includes at least one outwardly extending boss that engages a portion of the arm when the nose is seating in the socket during mold closure.

26. The mold lock of claim 25 wherein the at least one boss has a rounded outer surface.

27. The mold lock of claim 26 wherein the at least one boss is inwardly offset relative to the adjacent head sidewall enabling engagement with an adjacent arm when the nose is seating in the socket in a manner that compensates for misalignment between the mold halves during mold closure.

28. The mold lock of claim 27 wherein the at least one boss comprises a rotatable, elongate roller.

29. The mold lock of claim 26 wherein the at least one boss is inwardly offset relative to the adjacent head sidewall providing clearance with a corresponding adjacent arm enabling engagement with the adjacent arm when the nose is seating in the socket in a manner that compensates for as much as 5° misalignment between the mold halves during mold closure.

30. The mold lock of claim 29 wherein there is at least 0.1 inch clearance between the at least one boss and the adjacent arm at or adjacent a mouth or opening of the socket.

31. The mold lock of claim 30 wherein there is between a 0.1 inch clearance and a 0.3 inch clearance between the at least one boss and the adjacent arm.

32. The mold lock of claim 31 wherein there is about 0.2 inch clearance between the at least one boss and the adjacent arm.

33. An interlock assembly for a mold that has a plurality of mold halves, comprising:
a receiver that is carried by one of the mold halves comprised of a pocket defined at least in part by a pair of sidewalls that each extends outwardly from a bottom wall disposed between the sidewalls, a pair of outwardly extending first interlock projections, and a pair of spaced apart recesses with each recess disposed outboard of a corresponding one of the first interlock projections and outboard of the pocket;
a male interlock that is carried by another one of the mold halves that registers with the receiver when the one of the mold halves and the another one of the mold halves are juxtaposed during mold closing, the male interlock comprising an outwardly extending head received in the pocket in the receiver, and a pair of outwardly extending second interlock projections spaced from the head that each define a corresponding one of a pair of channels with the head; and
wherein each interlock channel in the male interlock receives a corresponding one of the first interlock projections of the receiver and each recess in the receiver receives a corresponding one of the second interlock projections of the male interlock when the mold halves are juxtaposed during mold closing.

34. The interlock assembly of claim 33, wherein the head of the male interlock comprises a nose and further comprising an insert carried by the nose of the male interlock, the insert contacting the receiver during registry of the male interlock with the receiver when the head of the male interlock is received in the pocket in the receiver.

35. The interlock assembly of claim 33, wherein the pocket defining sidewalls of the receiver each comprise a tapered portion adjacent a mouth of the pocket and the head of the male interlock is defined by a pair of sidewalls that each comprise a substantially complementarily tapered portion that engages with a corresponding one of the tapered portions of a respective one of the pocket defining sidewalls when the mold halves are juxtaposed in a closed position.

36. The interlock assembly of claim 33, wherein each one of the first interlock projections of the receiver comprises a first mating surface inclined at a first acute angle relative to a longitudinally extending centerline of the receiver pocket, wherein each one of the second interlock projections of the male interlock comprises a second mating surface inclined at a second acute angle relative to a longitudinally extending centerline of the male interlock head, and wherein the first and second mating surfaces engage when the mold halves are juxtaposed in a closed position.

37. The interlock assembly of claim 36, wherein the first and second acute angles are each less than 10°.

38. The interlock assembly of claim 36, wherein the head of the male interlock is defined by a pair of sidewalls and each interlock channel is formed by one of the male interlock head sidewalls, the second mating surface, and an endwall.

* * * * *